(12) United States Patent
Nobukuni

(10) Patent No.: US 9,050,731 B2
(45) Date of Patent: Jun. 9, 2015

(54) WEB MEMBER CUTTING APPARATUS FOR CUTTING WEB MEMBER THAT HAS A PLURALITY OF FIBERS INCLUDING TOWS AND WEB MEMBER CUTTING METHOD

(71) Applicant: Unicharm Corporation, Ehime (JP)

(72) Inventor: Hisaoki Nobukuni, Kanonji (JP)

(73) Assignee: UNI-CHARM CORPORATION, Ehime (JP)

( * ) Notice: Subject to any disclaimer, the term of this patent is extended or adjusted under 35 U.S.C. 154(b) by 174 days.

(21) Appl. No.: 13/755,552

(22) Filed: Jan. 31, 2013

(65) Prior Publication Data
US 2013/0305892 A1 Nov. 21, 2013

(30) Foreign Application Priority Data

May 21, 2012 (JP) ................................. 2012-115785

(51) Int. Cl.
*B27B 33/02* (2006.01)
*B26D 1/00* (2006.01)
(Continued)

(52) U.S. Cl.
CPC .............. *B26D 1/0006* (2013.01); *B26D 1/157* (2013.01); *B26D 7/015* (2013.01); *B26D 1/18* (2013.01); *B26D 7/0625* (2013.01); *B26D 7/14* (2013.01); *B26D 2001/006* (2013.01)

(58) Field of Classification Search
CPC .. B26D 2001/006; B26D 1/0006; B26D 1/18; B26D 1/157; B26D 7/015; B26D 7/14; B26D 7/0625; B26D 1/185; B26D 1/1575
USPC ............. 83/205, 409, 409.1, 266, 499, 471.2, 83/485, 734, 422, 408, 331, 341, 42, 56, 83/262, 202, 225–230, 13, 835, 846–848, 83/663, 666; 26/7; 27/170, 147
See application file for complete search history.

(56) References Cited

U.S. PATENT DOCUMENTS 760,800 A * 5/1904 Nice ................................ 83/455
855,301 A * 5/1907 Gobie .......................... 83/471.2
(Continued)

FOREIGN PATENT DOCUMENTS

JP 5859797 A 4/1983
JP 60149319 A 8/1985
(Continued)

OTHER PUBLICATIONS

International Search Report mailed on Jul. 16, 2013 corresponds to PCT/JP2013/063013.
(Continued)

*Primary Examiner* — Sean Michalski
(74) *Attorney, Agent, or Firm* — Lowe Hauptman & Ham, LLP

(57) ABSTRACT

Disclosed is an apparatus for cutting a web member along an intersecting direction. The web member has a plurality of fibers including tows along a predetermined direction intersecting the intersecting direction. The apparatus includes a disc-like rotatable blade member for cutting the web member by relatively moving in the intersecting direction with respect to the web member while rotating about a rotation shaft, the rotation shaft extending along the predetermined direction, the rotatable blade member including a cutting edge on an outer circumferential edge portion thereof, a plurality of recess portions being formed on the cutting edge, the plurality of recess portions being arranged along a circumferential direction of the rotatable blade member, a mean value of lengths of the plurality of recess portions in the circumferential direction being smaller than a mean value of diameters of the tows contained in the web member.

7 Claims, 14 Drawing Sheets

(51) Int. Cl.
  B26D 1/157 (2006.01)
  B26D 7/01 (2006.01)
  B26D 1/18 (2006.01)
  B26D 7/06 (2006.01)
  B26D 7/14 (2006.01)

(56) References Cited

U.S. PATENT DOCUMENTS

| | | | | |
|---|---|---|---|---|
| 1,079,998 A * | 12/1913 | Arrants | | 83/487 |
| 1,434,475 A * | 11/1922 | Austin | | 83/455 |
| 1,615,901 A * | 2/1927 | Carlson | | 83/485 |
| 1,735,520 A * | 11/1929 | Williams | | 83/485 |
| 1,949,490 A * | 3/1934 | Ross | | 30/264 |
| 2,759,542 A * | 8/1956 | Weissuhn | | 83/429 |
| 3,143,023 A * | 8/1964 | Addin | | 83/472 |
| 3,605,537 A * | 9/1971 | Pickler | | 83/121 |
| 3,657,952 A * | 4/1972 | Brockbank et al. | | 83/102 |
| 3,665,982 A * | 5/1972 | Kvalheim | | 83/404.2 |
| 3,821,915 A * | 7/1974 | Larrable | | 83/174 |
| 3,910,142 A * | 10/1975 | Jureit et al. | | 83/74 |
| 4,353,274 A * | 10/1982 | Shimizu | | 83/156 |
| 4,444,077 A * | 4/1984 | Wise et al. | | 83/319 |
| 4,452,117 A * | 6/1984 | Brickner et al. | | 83/468 |
| 4,548,108 A * | 10/1985 | Dennis | | 83/27 |
| 4,649,782 A * | 3/1987 | Cavagna | | 83/425.4 |
| 4,813,316 A * | 3/1989 | Johnson et al. | | 83/42 |
| 5,033,344 A * | 7/1991 | Ohneda et al. | | 83/262 |
| 5,046,392 A * | 9/1991 | Keon et al. | | 83/862 |
| 5,249,491 A * | 10/1993 | Carter | | 83/13 |
| 5,355,156 A * | 10/1994 | Balzeit et al. | | 346/138 |
| 5,715,738 A * | 2/1998 | Yetman | | 83/614 |
| 6,014,921 A * | 1/2000 | Angel et al. | | 83/862 |
| 6,056,682 A * | 5/2000 | Belanger et al. | | 493/340 |
| 6,119,675 A * | 9/2000 | Akram et al. | | 125/23.01 |
| 6,212,983 B1 * | 4/2001 | Pyle | | 83/34 |
| 6,308,602 B1 * | 10/2001 | Gerber | | 83/76.6 |
| 6,394,330 B1 * | 5/2002 | Jackson | | 225/2 |
| 6,418,825 B1 * | 7/2002 | Hartmann | | 83/110 |
| 6,640,855 B2 * | 11/2003 | Giles | | 144/357 |
| 6,644,154 B2 * | 11/2003 | Wierschke et al. | | 83/174 |
| 6,681,669 B1 * | 1/2004 | Bogan | | 83/176 |
| 6,732,625 B1 * | 5/2004 | Boynton et al. | | 83/482 |
| 6,782,889 B2 * | 8/2004 | Ducci et al. | | 131/84.1 |
| 6,813,985 B2 * | 11/2004 | Gharst et al. | | 83/863 |
| 7,000,658 B1 * | 2/2006 | Soukiassian et al. | | 144/3.1 |
| 7,047,856 B2 * | 5/2006 | Nurenberg et al. | | 83/471.3 |
| 7,124,672 B2 * | 10/2006 | Marocco | | 83/197 |
| 7,284,305 B1 * | 10/2007 | Allen et al. | | 26/7 |
| 7,430,948 B2 * | 10/2008 | De Marco et al. | | 83/236 |
| 7,434,373 B2 * | 10/2008 | Pommier | | 53/435 |
| 7,861,630 B2 * | 1/2011 | Sorensen et al. | | 83/42 |
| 2001/0022285 A1 * | 9/2001 | Gambini | | 209/698 |
| 2003/0079589 A1 * | 5/2003 | Kovacs | | 83/42 |
| 2004/0069106 A1 * | 4/2004 | McAdoo | | 83/34 |
| 2004/0221700 A1 * | 11/2004 | Williams et al. | | 83/236 |
| 2005/0097695 A1 | 5/2005 | Tanaka et al. | | |
| 2005/0211031 A1 * | 9/2005 | James et al. | | 83/13 |
| 2006/0179989 A1 * | 8/2006 | James et al. | | 83/284 |
| 2008/0034936 A1 * | 2/2008 | Loibl | | 83/455 |
| 2008/0110311 A1 * | 5/2008 | Stangherlin | | 83/177 |
| 2009/0211420 A1 * | 8/2009 | Loibl | | 83/485 |
| 2009/0266211 A1 * | 10/2009 | Westfall et al. | | 83/208 |
| 2010/0024621 A1 * | 2/2010 | Van Cleave et al. | | 83/471.2 |
| 2010/0257984 A1 * | 10/2010 | Scaroni et al. | | 83/13 |
| 2011/0296964 A1 * | 12/2011 | Muller et al. | | 83/23 |
| 2011/0308097 A1 * | 12/2011 | Vollrath | | 30/388 |
| 2012/0167736 A1 | 7/2012 | Yokoe | | |
| 2013/0087029 A1 * | 4/2013 | Iyatani | | 83/13 |
| 2013/0305894 A1 * | 11/2013 | Nobukuni | | 83/37 |

FOREIGN PATENT DOCUMENTS

| | | |
|---|---|---|
| JP | 3154797 A | 7/1991 |
| JP | 7690 U | 1/1995 |
| JP | 2005-040641 | 2/2005 |
| JP | 2011-062802 | 3/2011 |

OTHER PUBLICATIONS

Canadian Office Action in corresponding Canadian Application No. 2,869,795, dated Nov. 26, 2014.

* cited by examiner

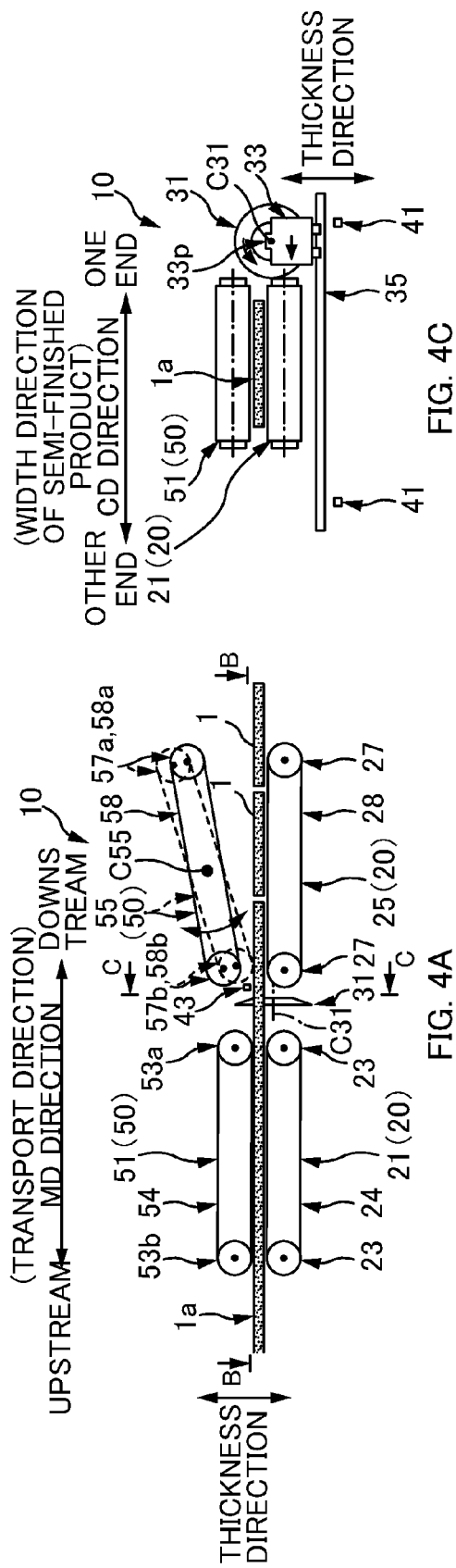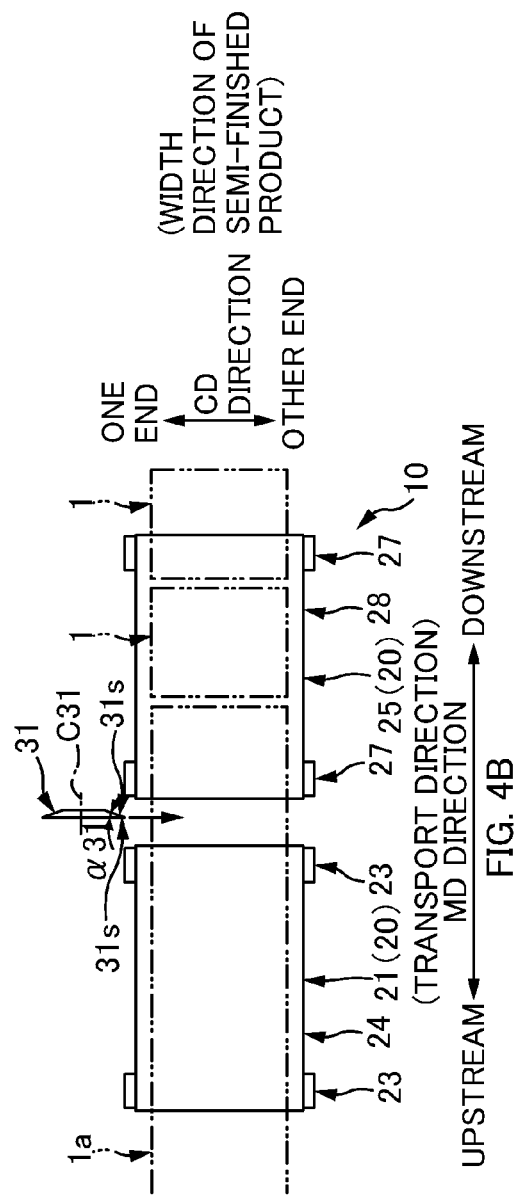

FIG. 12

TABLE 1

| MATERIAL | BLADE EDGE ANGLE α31 | | | | | |
|---|---|---|---|---|---|---|
| | 12° | 15° | 17° | 20° | 25° | 30° |
| SUS440c | GOOD | GOOD | GOOD | GOOD | FAIR | POOR |
| SKS | GOOD | GOOD | GOOD | GOOD | FAIR | POOR |
| SKH | IMPOSSIBLE TO POLISH | FAIR | GOOD | GOOD | FAIR | POOR |
| WC | IMPOSSIBLE TO POLISH | FAIR | GOOD | GOOD | FAIR | POOR |

TABLE 2

| NUMBER OF CUTTING TIMES | RECESS PORTION DEPTH (μm) | | | |
|---|---|---|---|---|
| | DEPTH ≦2 | 2<DEPTH<5 | 5≦DEPTH<10 | 10≦DEPTH<20 |
| 500 | FAIR | GOOD (W/O MOLTEN RESIDUE) | GOOD (W/ MOLTEN RESIDUE) | GOOD (W/ MOLTEN RESIDUE) |
| 1000 | FAIR | GOOD (W/O MOLTEN RESIDUE) | GOOD (W/ MOLTEN RESIDUE) | GOOD (W/ MOLTEN RESIDUE) |

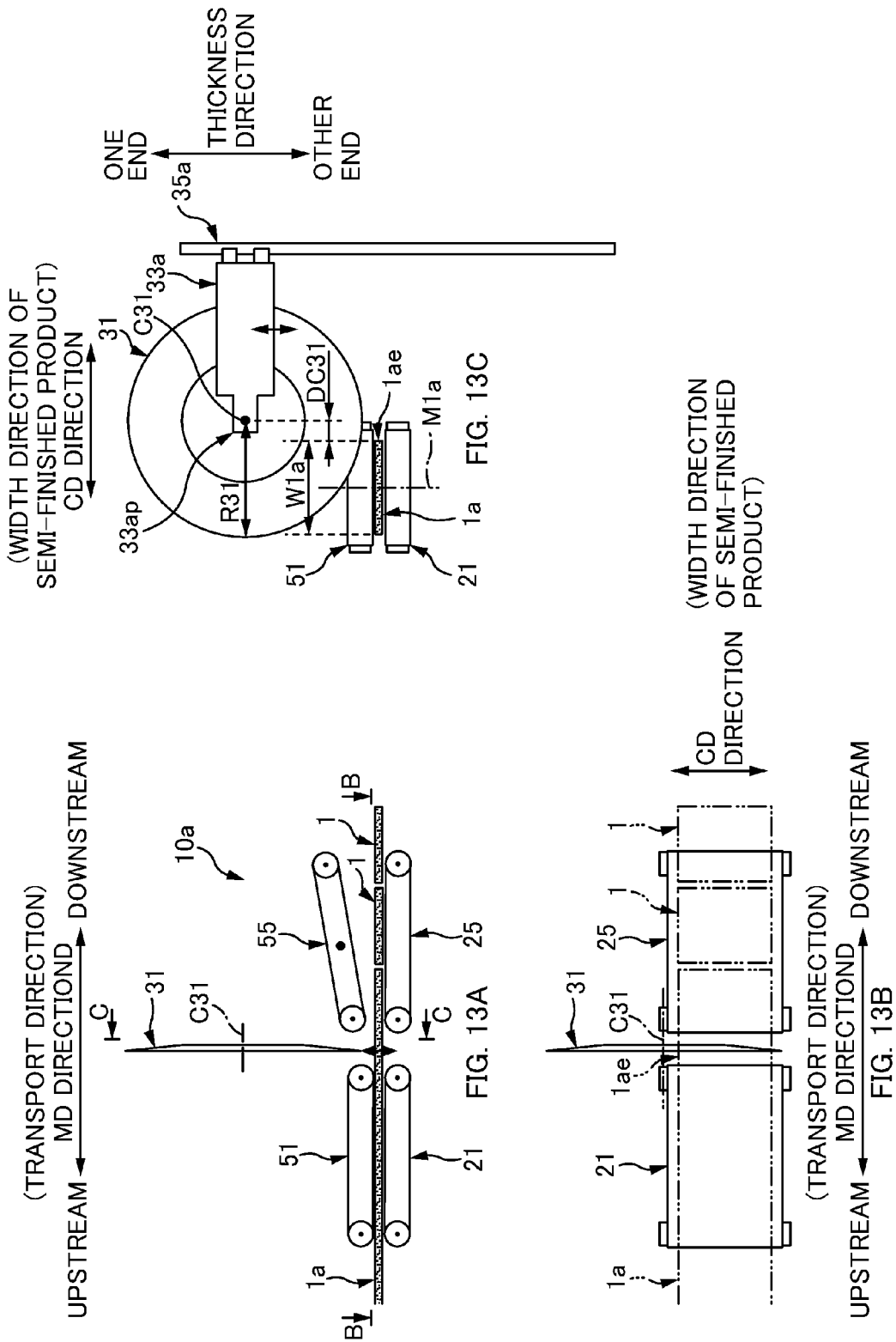

WEB MEMBER CUTTING APPARATUS FOR CUTTING WEB MEMBER THAT HAS A PLURALITY OF FIBERS INCLUDING TOWS AND WEB MEMBER CUTTING METHOD

CROSS-REFERENCE TO RELATED APPLICATIONS

The present application claims priority from Japanese Patent Application No. 2012-115785 filed on May 21, 2012, which are herein incorporated by reference.

BACKGROUND

1. Technical Field

The present invention relates to an apparatus and a method for cutting a web member that has a plurality of fibers including tows.

2. Related Art

A conventional cleaning web member is known into which a handle member is inserted to make the web member usable for cleaning of a tabletop and the like (JP 2005-40641A). Such a cleaning web member has a main body in which a plurality of fibers are layered on a base sheet. As the fibers, used are continuous fibers made of a thermoplastic resin, called tows.

In the production line of the cleaning web member, a plurality of tows whose fiber direction is in a predetermined direction are secured by means such as welding to a base sheet that is continuous along the predetermined direction. Thus, a web member that is continuous in the predetermined direction is formed as a semi-finished product. Finally, this web member is cut along a width direction that intersects the predetermined direction so that single-cut cleaning web members are manufactured.

As a method for cutting this web member, the cutting apparatus disclosed in JP 2011-62802A can be considered. That is to say, the web member is cut by passing the web member through a space between a cutter roll and an anvil roll and pressing the web member between the cutter blade and the receiver blade. The cutter roll has an outer circumferential face having a cutter blade, and the anvil roll has a receiver blade that receives the cutter blade.

However, the tows used in the web member are thermoplastic ones. Therefore, tows are attached at the target cut position by welding or compression-bonding because the web member is pressed between the cutter blade and the receiver blade during cutting. This may cause a trouble that the cut edges is bound to each other in loops, which results in deterioration of the performance of the brush section (dust trapping performance during cleaning).

Furthermore, if the cut edges are bound to each other in loops, bulkiness of the cleaning web member decreases, which also lowers the performance of the brush section.

Furthermore, due to contact of the cutter blade with the receiver blade during cutting, the cutting edge of the cutter blade is likely to be worn, which shortens the life of the cutter blade.

As a method in a reference example that can solve these problems, it is conceivable that the web member is cut as follows: a rotatable blade is used whose cutting edge in the outer circumferential edge portion has a plurality of recess portions; a rotatable blade is moved in the width direction of the web member while being driven and rotated about a rotation shaft along the predetermined direction; and thereby the web member is cut. With this method, a high cutting performance is achieved by driving and rotating the rotatable blade. In addition, the cutting is facilitated by causing tows to be caught on the recess portions. Thus, the cutting can be reliably performed simply by bringing the rotatable blade into contact with the web member. The rotatable blade does not require a receiver blade against which the web member is pressed during cutting. This can reliably prevent tows from being attached at a target cut position by welding or compression-bonding, which may occur during pressing. Furthermore, since the cutting edge of the rotatable blade is brought into contact only with the web member during cutting. This can suppress wear of the rotatable blade.

Furthermore, with the above-described cutting method using the rotatable blade, cut fibers such as tows are in contact with the blade faces of the disc-like rotatable blade throughout a period from when cutting of the fibers is just started to when the web member is completely cut by the rotatable blade. Due to rotation of the blade faces, the cut fibers are spread and loosened in directions such as the thickness direction of the web member. Thus, fibers near a cut position in the web member can become very soft and bulky. This can achieve high bulkiness of the single-cut product of the web member formed by cutting, that is, the cleaning web member.

However, depending on the size of the recess portions in the outer circumferential edge portion of the rotatable blade, the tows easily enter into the recess portions. If the tows enter into the recess portions, molten residue of the tows easily adheres to portions near the recess portions and is accumulated on the cutting edge. As a result, the cutting performance (cutting capability) of the rotatable blade is lowered. Accordingly, molten residue has to be regularly removed from the cutting edge, which results in low productivity.

SUMMARY

The invention has been made in view of the above conventional problems, and an advantage thereof is to prevent the following phenomena: in the case of cutting of a web member that has a plurality of fibers including tows and that is continuous in a predetermined direction, when a rotatable blade cuts the web member in an intersecting direction which intersects the predetermined direction, molten residue of tows are accumulated on a cutting edge of the rotatable blade and the tows enter into a plurality of recess portions that are formed on the cutting edge.

An aspect of the invention to achieve the above advantage is a web-member cutting apparatus for cutting a web member along an intersecting direction, the web member having a plurality of fibers including tows along a predetermined direction and being continuous in the predetermined direction, the intersecting direction intersecting the predetermined direction, the web-member cutting apparatus including:

a disc-like rotatable blade member that cuts the web member by relatively moving in the intersecting direction with respect to the web member while rotating about a rotation shaft, the rotation shaft extending along the predetermined direction, the rotatable blade member including a cutting edge on an outer circumferential edge portion thereof, a plurality of recess portions being formed on the cutting edge, the plurality of recess portions being arranged along a circumferential direction of the rotatable blade member, a mean value of lengths of the plurality of recess portions in the circumferential direction being smaller than a mean value of diameters of the tows contained in the web member.

Further, a method for cutting a web member along an intersecting direction, the web member having a plurality of fibers including tows along a predetermined direction and being continuous in the predetermined direction, the intersecting direction intersecting the predetermined direction, the method including:

rotating a disc-like rotatable blade member about a rotation shaft along the predetermined direction the rotatable blade member including a cutting edge on an outer circumferential edge portion thereof, a plurality of recess portions being formed on the cutting edge, the plurality of recess portions being arranged along the outer circumferential edge portion, a mean value of lengths of the plurality of recess portions in the circumferential direction being smaller than a mean value of diameters of the tows contained in the web member; and cutting the web member by rotating and relatively moving the rotatable blade member in an intersecting direction with respect to the web member, the intersecting direction intersecting the predetermined direction.

Other features of this invention will become apparent from the description in this specification and the attached drawings.

BRIEF DESCRIPTION OF THE DRAWINGS

FIG. 4A is a schematic side view of a cutting apparatus 10 of a first embodiment, FIG. 4B is a view along arrows B-B in FIG. 4A, and FIG. 4C is a view along arrows C-C in FIG. 4A.

FIGS. 7A to 7G are schematic diagrams showing how the single-cut cleaning web members 1 are produced by the cutting apparatus 10 cutting the semi-finished product 1a.

FIG. 10 is a schematic diagram showing a preferred example of press positions PP51 and PP55 of an upstream pressing member 51 and a downstream pressing member 55 on the semi-finished product 1a.

FIG. 12 shows Tables 1 and 2 respectively showing experimental standards and experimental results according to an experiment for discussing various designs of the rotatable blade 31.

FIG. 13A is a schematic side view of a cutting apparatus 10a of a second embodiment, and FIG. 13B is a view along arrows B-B in FIG. 13A, and, FIG. 13C is a view along arrows C-C in FIG. 13A.

DESCRIPTION OF EXEMPLARY EMBODIMENTS

Figure 1:
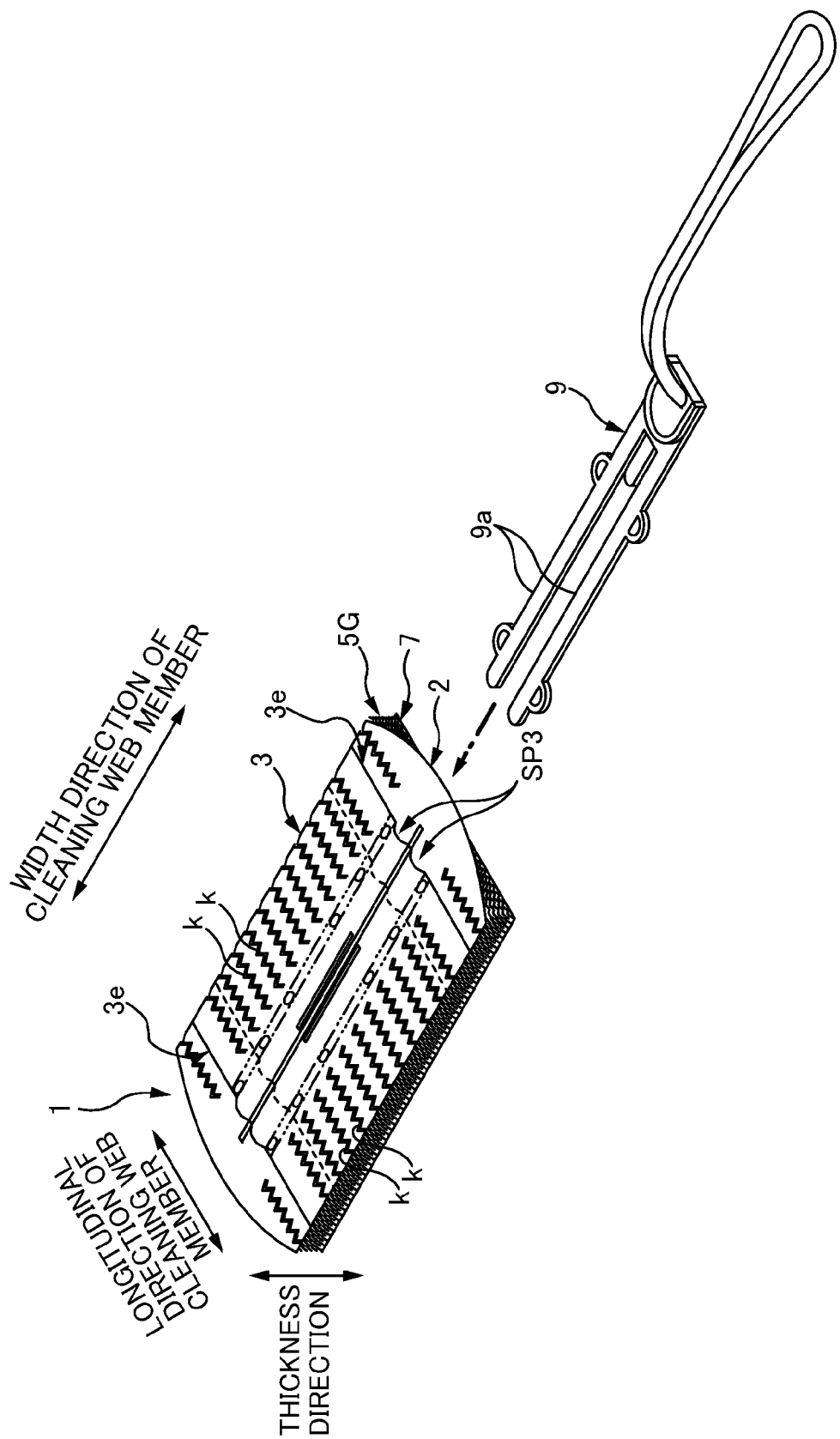
FIG. 1 is a perspective view of a cleaning web member 1.

A web-member cutting apparatus for cutting a web member along an intersecting direction, the web member having a plurality of fibers including tows along a predetermined direction and being continuous in the predetermined direction, the intersecting direction intersecting the predetermined direction, the web-member cutting apparatus including:

a disc-like rotatable blade member that cuts the web member by relatively moving in the intersecting direction with respect to the web member while rotating about a rotation shaft, the rotation shaft extending along the predetermined direction, the rotatable blade member including a cutting edge on an outer circumferential edge portion thereof, a plurality of recess portions being formed on the cutting edge, the plurality of recess portions being arranged along a circumferential direction of the rotatable blade member, a mean value of lengths of the plurality of recess portions in the circumferential direction being smaller than a mean value of diameters of the tows contained in the web member.

With this web-member cutting apparatus, the mean value of the lengths of the recess portions in the circumferential direction is smaller than the mean value of the diameters of the tows in the web member. This makes it difficult for the tows to enter into the recess portions. It is possible to effectively suppress adhesion of molten residue of the tows to portions near the recess portions, the adhesion being caused by the tows entering into the recess portions. The molten residue of the tows can be prevented from being accumulated on the cutting edge.

In such a web-member cutting apparatus, it is desirable that the mean value of lengths of the plurality of recess portions in the circumferential direction is smaller than a minimum value of diameters of the tows contained in the web member.

With this web-member cutting apparatus, the mean value of the lengths of the recess portions in the circumferential direction is smaller than the minimum value of the diameters of the tows in the web member. This makes it more difficult for the tows to enter into the recess portions. It is possible to more effectively suppress adhesion of molten residue of the tows to portions near the recess portions, the adhesion being caused due to the tows entering into the recess portions. The molten residue of the tows can be reliably prevented from being accumulated on the cutting edge.

In such a web-member cutting apparatus, it is desirable that a mean value of depths of the plurality of recess portions is smaller than the mean value of diameters of the tows contained in the web member.

With this web-member cutting apparatus, the mean value of the depths of the recess portions is smaller than the mean value of the diameters of the tows in the web member. Accordingly, even if tows having a diameter smaller than the length of the recess portions in the circumferential direction enter into the recess portions, the entering depth is relatively small. Therefore, the tows can be released from the recess portions in a relatively short time. This makes it possible to suppress adhesion of molten residue of the tows to portions near the recess portions. The molten residue of the tows can be prevented from being accumulated on the cutting edge.

In such a web-member cutting apparatus, it is desirable that
the mean value of depths of the plurality of recess portions is smaller than a minimum value of diameters of the tows contained in the web member.

With this web-member cutting apparatus, the mean value of depths of recess portions is smaller than the minimum value of the diameters of the tows in the web member. Accordingly, the entering depth of the tows into the recess portions becomes smaller. The tows can be released from the recess portions in a shorter time.

In such a web-member cutting apparatus, it is desirable
that the rotatable blade member is made of cemented carbide,
that the rotatable blade member has a perfect circular shape in which the rotation shaft is set at a center of the circle, and
that an angle on the outer circumferential edge portion between both blade faces of the rotatable blade member is set to any value from 15° to 20° (both inclusive).

With this web-member cutting apparatus, the angle on the outer circumferential edge portion between both blade faces of the rotatable blade member is 20° or less. Therefore, a high cutting performance can be achieved. Further, this angle is 15° or more. This makes it possible to effectively suppress fractures in the cutting edge during polishing, which easily occurs to the rotatable blade having an edge angle of less than 15° and made of cemented carbide.

Furthermore, since the rotatable blade member is made of cemented carbide, it can have excellent wear resistance. The high cutting performance can be maintained for a long time.

In such a web-member cutting apparatus, it is desirable that
the web-member cutting apparatus further includes:
an intermittent transport mechanism that intermittently transports the web member in a transport direction, the transport direction being the predetermined direction; and
a downstream pressing member that regulates movement of the web member by pressing the web member against the intermittent transport mechanism at a position downstream from a target cut position in the transport direction throughout a period during which the rotatable blade member is cutting the web member whose transport is suspended.

With this web-member cutting apparatus, the web member is cut during transport suspension of the web member. This makes the cutting operation stabler.

Furthermore, at the time of cutting, the downstream pressing member presses the web member against the intermittent transport mechanism at a position downstream in the transport direction from a target cut position of the web member; at this stage, the intermittent transport mechanism is suspended. Thereby, movement of the web member is regulated. This makes it possible to effectively prevent disordered movement of the web member due to contact of the web member with the rotatable blade member that moves in the intersecting direction while rotating. Thus, a good cutting performance can be achieved.

A method for cutting a web member along an intersecting direction,
the web member having a plurality of fibers including tows along a predetermined direction and being continuous in the predetermined direction, the intersecting direction intersecting the predetermined direction, the method including:
rotating a disc-like rotatable blade member about a rotation shaft along the predetermined direction
the rotatable blade member including a cutting edge on an outer circumferential edge portion thereof,
a plurality of recess portions being formed on the cutting edge,
the plurality of recess portions being arranged along the outer circumferential edge portion,
a mean value of lengths of the plurality of recess portions in the circumferential direction being smaller than a mean value of diameters of the tows contained in the web member; and
cutting the web member by rotating and relatively moving the rotatable blade member in an intersecting direction with respect to the web member, the intersecting direction intersecting the predetermined direction.

With this web member cutting method, the mean value of the lengths of the recess portions in the circumferential direction is smaller than the mean value of the diameters of the tows in the web member. This makes it difficult for the tows to enter into the recess portions. It is possible to effectively suppress adhesion of molten residue of the tows to portions near the recess portions, the adhesion being caused by the tows entering into the recess portions. The molten residue of the tows can be prevented from being accumulated on the cutting edge.

—First Embodiment—

Figure 2A:
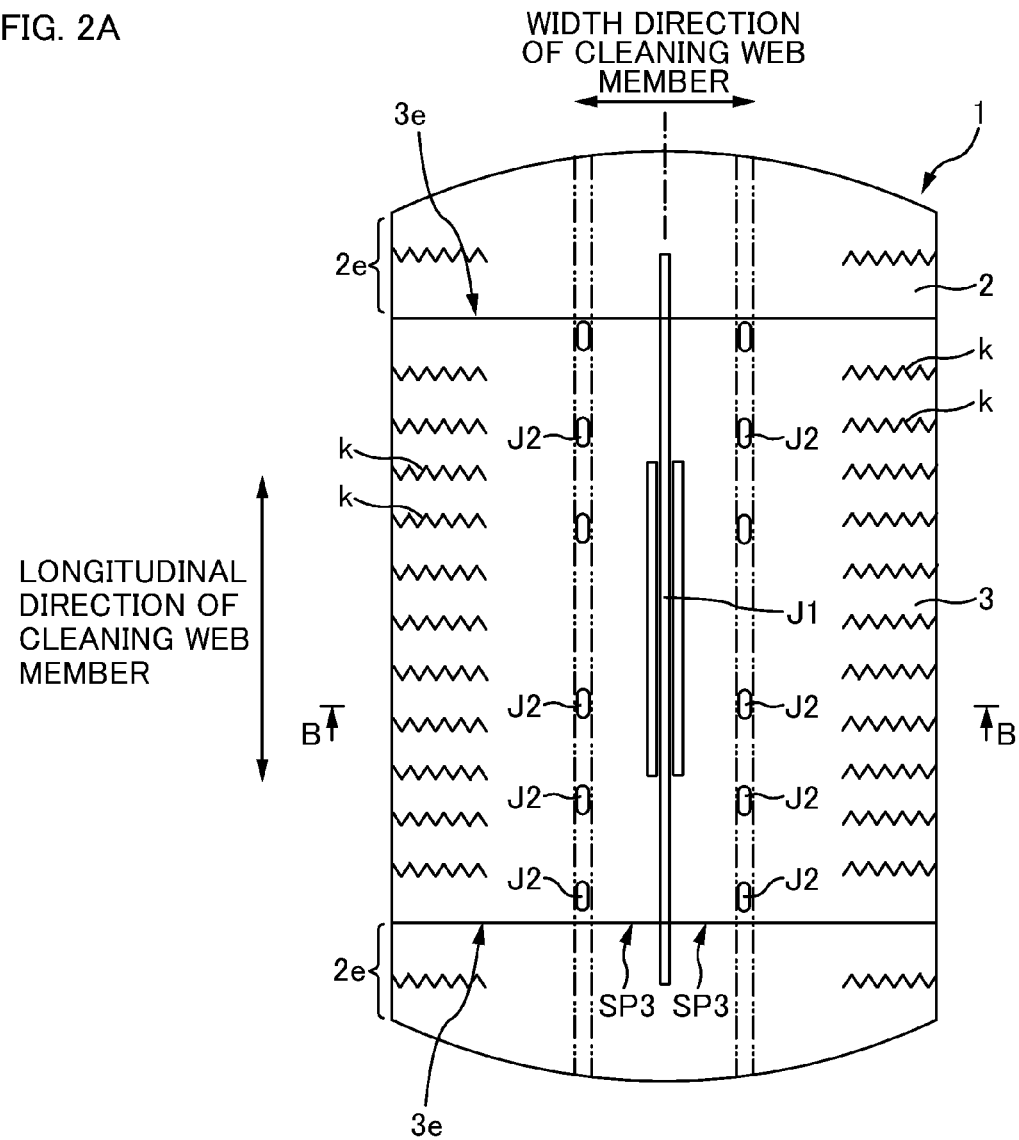
FIG. 2A is a plan view of the cleaning web member 1.

FIG. 1 is a perspective view of a cleaning web member 1 formed by cutting using a cutting apparatus 10 of the first embodiment. FIG. 2A is a plan view thereof, and FIG. 2B is a cross-sectional view taken along line B-B in FIG. 2A.

As shown in FIGS. 1 and 2A, the cleaning web member 1 is substantially in the shape of a rectangle having a longitudinal direction and a width direction when viewed from above. Furthermore, as shown in FIGS. 1 and 2B, in the thickness direction, the cleaning web member 1 includes: a base sheet 2; an auxiliary sheet 3 that covers the top surface of the base sheet 2, a fiber bundle member 5G that covers the bottom surface of the base sheet 2 and forms a main brush section, and a strip sheet 7 that is placed on the bottom surface of the fiber bundle member 5G and forms an auxiliary brush section. Here, hollows SP3 and SP3 into which a handle member 9 is inserted and secured are formed between the auxiliary sheet 3 and the base sheet 2. Insertion sections 9a and 9a of a fork-shaped part of the handle member 9 are inserted into the hollows SP3 and SP3, and the bottom surface and both end faces in the width direction of the cleaning web member 1 is used as wiping surfaces. Thus, the cleaning web member 1 is used for cleaning of a tabletop and the like.

Figure 2B:
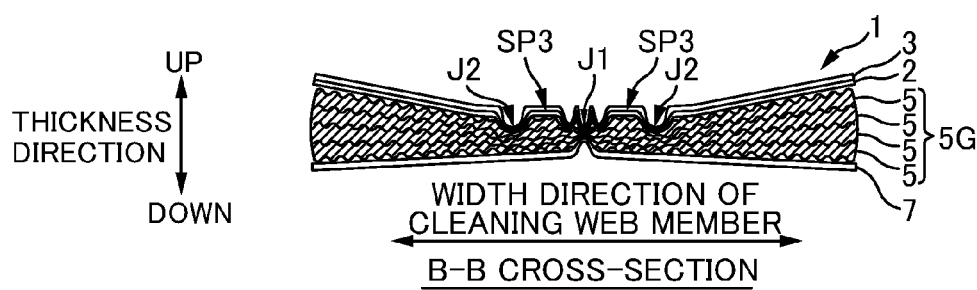
FIG. 2B is a cross-sectional view taken along line B-B in FIG. 2A.

As shown in FIG. 2B, the fiber bundle member 5G is a member having a plurality of fiber bundles 5 stacked in the thickness direction. Although four fiber bundles 5 are stacked in the thickness direction to form a four-layer structure in this example as an example of the plurality of fiber bundles, but the number of the fiber bundles 5 is not limited to this.

Each of the fiber bundles 5 has tows having a size of 3.5 dtex (a diameter of 18 to 25 μm (mean diameter: 22 μm)) as a number of continuous fibers. However, the size of the tows is not limited to 3.5 dtex. For example, any value may be selected from the range of 1.1 to 10 dtex (a diameter of about 6 to 60 μm). Further, the fiber bundles 5 may each have tows having a plurality of sizes within the range of 1.1 to 10 dtex. Note that, if the lateral cross-section of the tows is not in the shape of a precise circle, the diameter refers to a mean diameter in the lateral cross-section. The "mean diameter in the lateral cross-section" will be defined later.

The tows are along the width direction of the cleaning web member 1. That is to say, the fiber direction of the tows (the longitudinal direction of each tow) is along the width direction of the cleaning web member 1. Accordingly, both end portions in the width direction basically serves as tip portions of the brush section. Note that, since these tows can be flexibly bent, the tip portions of the tows bend toward the bottom surface of the cleaning web member 1. This enables the bottom surface to also serve as a tip portion of the brush section. In this example, all fibers of the fiber bundles 5 are tows, but the invention is not limited thereto. That is to say, the fiber bundles 5 may contain fibers other than tows.

Note that tows refer to fibers made of continuous filaments, and examples thereof include: single fibers such as polyethylene terephthalate (PET), polypropylene (PP), or polyethylene (PE); composite fibers of a core-sheath structure such as a PE sheath and a PET core or a PE sheath and a PP core; and side-by-side composite fibers such as PE/PET or PE/PP. Note that the fibers may have crimps. In that case, crimping is performed during manufacture of the filaments, and the number of crimps is increased by a preheated calendar or under a hot-air treatment. The crimped tows are transferred by a transfer roll, and, at that time, a tensile force is applied in the longitudinal direction of the filaments and is then released. By repeating this processing, the continuous filaments of the tows are opened so as to be each independently separated.

As shown in FIGS. 1, 2A, and 2B, both of the base sheet 2 and the auxiliary sheet 3 are sheets substantially in the shape of rectangles when viewed from above. Although the base sheet 2 and the auxiliary sheet 3 have the same size in the width direction, the base sheet 2 is longer than the other in the longitudinal direction. Accordingly, when the auxiliary sheet 3 is stacked on the base sheet 2, both longitudinal end portions 2e and 2e of the base sheet 2 project outward by a predetermined length from both longitudinal ends 3e and 3e of the auxiliary sheet 3.

Furthermore, in this example, both of the base sheet 2 and the auxiliary sheet 3 have zigzag cuts k, k . . . in end portions in the width direction, the zigzag cuts k, k . . . being formed along the width direction with spacing in the longitudinal direction. With these cuts k, k, . . . , a plurality of zigzag strips extending along the width direction are formed on the ends of the base sheet 2 and the auxiliary sheet 3 in the width direction. However, the cuts k, k . . . are not essential.

The base sheet 2 and the auxiliary sheet 3 are formed by a nonwoven fabric containing thermoplastic fibers, for example. Examples of the thermoplastic fibers include: PE fiber; PP fiber; PET fiber; composite fiber of PE and PET (e.g., composite fiber having a core-sheath structure of a PE core and a PET sheath); and composite fiber of PE and PP (e.g., composite fiber having a core-sheath structure of a PET core and a PE sheath). Examples of the form of the nonwoven fabric include: a thermal bond nonwoven fabric; a spunbond nonwoven fabric; and a spunlace nonwoven fabric. However, the material of the base sheet 2 and the auxiliary sheet 3 is not limited to the nonwoven fabric described above.

The strip sheet 7 is formed of a flexible sheet such as a nonwoven fabric containing thermoplastic fibers or a thermoplastic resin film, and is a substantially rectangular shape having approximately the same planar size as that of the base sheet 2. On the ends of the strip sheet 7 in the width direction, formed are zigzag cuts (not shown) along the width direction with spacing in the longitudinal direction. With these cuts, a plurality of zigzag strips (not shown) extending along the width direction are formed in the ends of the strip sheet 7 in the width direction. However, the strip sheet 7 is not essential.

The auxiliary sheet 3, the base sheet 2, the four fiber bundles 5 of the fiber bundle member 5G, and the strip sheet 7 are stacked in the thickness direction in this order; they are joined into one piece by forming a plurality of welded-bonded sections J1 and J2, as shown in FIGS. 2A and 2B.

For example, at the center position in the width direction, formed is the first welded-bonded section J1 having the shape of a straight line along the longitudinal direction. The first welded-bonded section J1 bonds, by welding, all layers in the thickness direction of the cleaning web member 1 (i.e., the entire structure of the auxiliary sheet 3, the base sheet 2, the four fiber bundles 5 of the fiber bundle member 5G, and the strip sheet 7).

Furthermore, at positions at a predetermined distance from both ends of the first welded-bonded section J1 in the width direction, formed are the plurality of island-like second welded-bonded sections J2, J2 . . . with spacing along the longitudinal direction. The second welded-bonded sections J2 are formed in order mainly to form the above-described hollows SP3 and SP3 in cooperation with the first welded-bonded section J1, the hollows SP3 and SP3 being for securing the handle member 9 between the auxiliary sheet 3 and the base sheet 2 by inserting into the hollows SP3 and SP3. Accordingly, as shown in FIG. 2B, on the second welded-bonded sections J2, bonded are the following components which are located on the upper side in the thickness direction: the auxiliary sheet 3, the base sheet 2, and two fiber bundles 5 and 5 located closer to the base sheet 2. On the other hand, the following components are not bonded: two fiber bundles 5 and 5 located on the lower side and the strip sheet 7 located below the fiber bundles 5. The welded-bonded sections J1, J2, J2 . . . are formed, for example, by ultrasonic welding.

Figure 3:
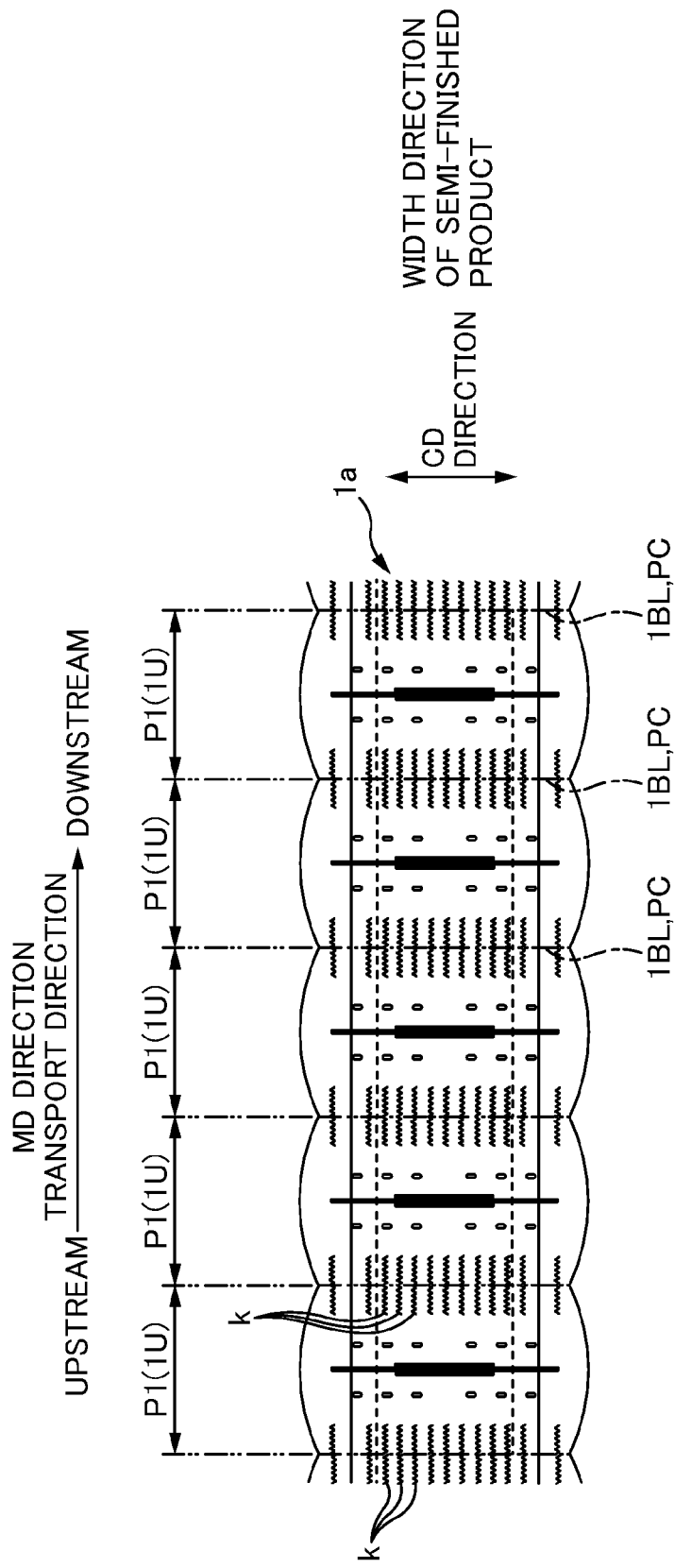
FIG. 3 is a schematic view of a semi-finished product 1a, which corresponds to the cleaning web members 1 that has not been cut yet.

The cleaning web member 1 is manufactured by cutting a continuous body into a product size with the cutting apparatus 10 that is installed usually for the final processing in the production line. FIG. 3 is a schematic view showing a state before cutting. At this stage, all constituent components 3, 2, 5, 5, 5, 5, and 7 of the cleaning web member 1 such as the base sheet 2 and the fiber bundle 5 have already been stacked and bonded by welding into one piece. But, these components have not been divided into individual cleaning web members 1; that is, they are in the form of a continuous body 1a in which portions 1U, 1U, . . . respectively corresponding to the cleaning web members 1, 1, . . . are continuously arranged along the transport direction in the production line. More specifically, the auxiliary sheet 3, the base sheet 2, and the strip sheet 7 are each in the form of a continuous sheet that is continuous in the transport direction. Furthermore, the fiber bundles 5 are also each in the form of a continuous body that is continuous in the transport direction. Hereinafter, the continuous body 1a according to the cleaning web member 1 is referred to as a "semi-finished product 1a", and the portion 1U of the semi-finished product 1a corresponding to the cleaning web member 1 is referred to as a "semi-finished product unit 1U".

In this example, the semi-finished product 1a is transported in a so-called "transverse direction" flowing. That is to say, the semi-finished product 1a is transported in a state where the direction corresponding to the width direction of the cleaning web member 1, which is a product, is in the transport direction. Accordingly, cut edges formed by cutting the semi-finished product 1a at a product pitch P1 in the transport direction correspond to end edges in the width direction of the cleaning web member 1. As clearly described above, the fiber direction of the tows in the fiber bundles 5 in the semi-finished product 1a is along the transport direction. Thus, the tows are also cut when the semi-finished product 1a is cut at the product pitch P1.

Hereinafter, the cutting apparatus 10 will be described. In the description below, the width direction of the semi-finished product 1a is also referred to as a "CD direction", and, among two directions orthogonal to the CD direction, the direction in which the semi-finished product 1a is continuous is also referred to as an "MD direction". Note that the MD direction also matches the transport direction of the semi-finished product 1a. Furthermore, the thickness direction of the semi-finished product 1a, the CD direction, and the MD direction are orthogonal to each other. Furthermore, the MD direction corresponds to a "predetermined direction" according to the claims, and the CD direction corresponds to an "intersecting direction" according to the claims.

FIG. 4A is a schematic side view of the cutting apparatus 10 of the first embodiment, FIG. 4B is a view along arrows B-B in FIG. 4A, and FIG. 4C is a view along arrows C-C in FIG. 4A. Note that, in these and other drawings used for the following description, in order to avoid complications regarding the diagrams, portions in the configuration may be omitted as appropriate.

The cutting apparatus 10 includes: an intermittent transport mechanism 20 that intermittently transports the semi-finished product 1a (corresponding to a web member); a rotatable blade 31 (corresponding to a rotatable blade member) that cuts the semi-finished product 1a when a transport of the semi-finished product 1a is suspended; a regulating member 50 that regulates movement of the semi-finished product 1a throughout the period during which the rotatable blade 31 is cutting the semi-finished product 1a; sensors 41 and 43 that monitor a state of the devices 20, 31, and 50 such as the intermittent transport mechanism 20; and a controller (not shown). The controller controls the operation of the devices, namely the intermittent transport mechanism 20, the rotatable blade 31, and the regulating member 50 based on a detection signal transmitted from the sensors 41 and 43 or the like. Thereby, the semi-finished product 1a is sequentially cut at the product pitch P1 into the single-cut cleaning web members 1.

The main body of the intermittent transport mechanism 20 is configured by two belt conveyors 21 and 25 that are arranged in the MD direction, for example. Specifically, one belt conveyor 21 is disposed at a position upstream in the MD direction from the installation position of the rotatable blade 31, and the other belt conveyor 25 is disposed at a position downstream in the MD direction from the installation position of the rotatable blade 31. Hereinafter, the former belt conveyor is referred to as an "upstream belt conveyor 21", and the latter belt conveyor is referred to as a "downstream belt conveyor 25".

The upstream belt conveyor 21 and the downstream belt conveyor 25 each include: a pair of rollers 23 and 23 (27 and 27) that are arranged in the MD direction; and an endless belt 24 (28) that is wrapped around the pair of rollers 23 and 23 (27 and 27). At least one roller 23 (27) of each pair of rollers 23 (27) is driven and rotated by a servomotor that serves as a driving source, and, thus, the semi-finished product 1a is transported downstream in the MD direction by the outer circumferential face of the endless belt 24 (28) as a transport surface. Note that the number of the rollers 23 (27) are not limited to two (a pair). For example, three rollers 23 (27) may be provided so as to move the endless belt 24 (28) along a path having a substantially triangular shape.

The two belt conveyors 21 and 25 perform substantially the same intermittent transport operation in conjunction with each other. Thus, the semi-finished product 1a quickly passes over the installation position of the rotatable blade 31 and is transported in the MD direction.

Suspension of the transport in the intermittent transport operation is performed by measuring the transport amount of the semi-finished product 1a using a rotation detection sensor such as a rotary encoder. The rotation detection sensor is provided on any one of the rollers 23 and 27 of the belt conveyors 21 and 25, for example. The rotation detection sensor repeatedly outputs a signal indicative of a rotational angle value of 0° to 360°, and the rotational angle value of 0° to 360° is allocated to a transport amount corresponding to one semi-finished product unit 1U, which is the product pitch P1. The transport is suspended when a rotational angle value that matches a target rotational angle value is output. Here, the target rotational angle value is predetermined, for example, so that a target cut position PC in the semi-finished product 1a substantially matches the installation position of the rotatable blade 31 in the MD direction at the time of the suspension; the target cut position PC is a boundary position 1BL (FIG. 3) between the semi-finished product units 1U and 1U that are adjacent to each other in the MD direction. Accordingly, the semi-finished product 1a is cut substantially at the boundary position 1BL between the semi-finished product units 1U. Here, it is possible to use a CCD camera or the like for measuring a displacement amount of the semi-finished product 1a from the target stop position at the time of the suspension and it is possible to correct the target rotational angle value based on this displacement amount. Note that the transport is restarted, for example, in cooperation with the regulating member 50, which will be described later.

The rotatable blade 31 has a main body configured by a disc-like plate having a perfectly circular shape, and a cutting edge is formed throughout the entire outer circumferential edge portion thereof. The rotatable blade 31 coaxially includes a rotation shaft C31 in an integrated manner. The rotation shaft C31 is along the MD direction and is supported on a support platform 33 with means such as a bearing (not shown). Furthermore, the support platform 33 is provided with a motor (not shown) as a driving source that drives and rotates the rotatable blade 31 about the rotation shaft C31. Accordingly, a rotational force of the motor is transmitted by an appropriate power transmission mechanism (not shown) such as an endless-belt power transmission device to the rotatable blade 31. Thus, the rotatable blade 31 is continuously driven and rotated in one direction at a circumferential velocity of, for example, 700 m/min to 4000 m/min, in this example, 880 m/min. Note that if the circumferential velocity is lower than 700 m/min, the cutting is difficult, and, if the velocity is too high, molten residue easily adheres to the cutting edge.

The rotatable blade 31, together with the support platform 33 that supports the rotatable blade 31, is guided so as to be reciprocally movable in the CD direction (corresponding to an intersecting direction) along an appropriate guide member 35 such as a linear guide. The rotatable blade 31 is reciprocally moved in the CD direction by an appropriate drive mechanism (not shown). Each stroke distance in the forward path and the return path according to the reciprocal movement is set to a distance that allows the rotatable blade 31 to cross the semi-finished product 1a in the CD direction across the entire width. Furthermore, the drive mechanism (not shown) includes: for example, a pair of pulleys that are arranged in the CD direction; an endless timing belt that is wrapped around the pair of pulleys; and a servomotor as a driving source that rotates the pulleys. Part of the endless timing belt is secured to the support platform 33. Accordingly, when the servomotor repeatedly rotates clockwise and anti-clockwise, the rotatable blade 31 is reciprocally moved in the CD direction. With such a rotatable blade 31, during a suspension period of transport of the semi-finished product 1a, the rotatable blade 31 moves from one side to the other side in the CD direction or moves from the other side to the one side while being driven and rotated about the rotation shaft C31. The cutting edge of the rotatable blade 31 that is being driven and rotated cuts the semi-finished product 1a during the movement. Hereinafter, in the reciprocal movement, the movement from the one side to the other side is referred to as a "forward-path movement", and the movement from the other side to the one side, which is movement in the opposite direction, is referred to as a "return-path movement".

Here, proximity switches 41 and 41 are provided respectively near the ends of the blade stroke on the one side and the other side in the CD direction. When the rotatable blade 31 has moved across the semi-finished product 1a in the CD direction and arrived at either of the ends, the proximity switches 41 and 41 detect the arrival and output a detection signal. The detection signal output from the sensors 41 is used for controlling the regulating member 50, which will be described later.

Figure 5A:
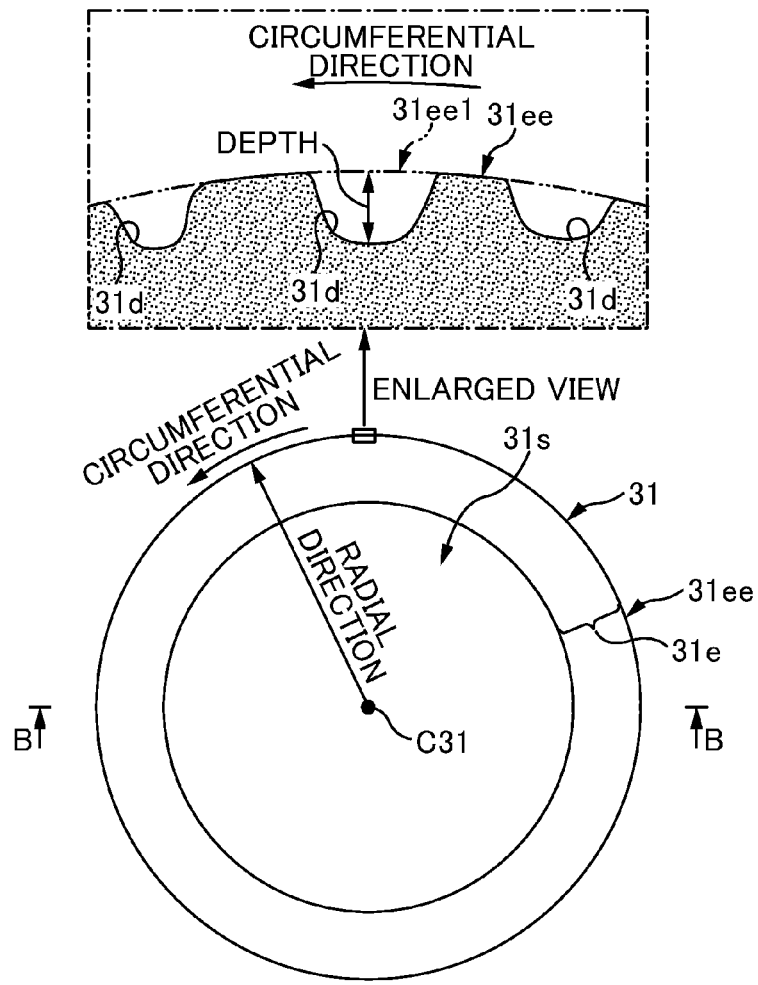
FIG. 5A is a plan view of a rotatable blade 31.
Figure 5B:
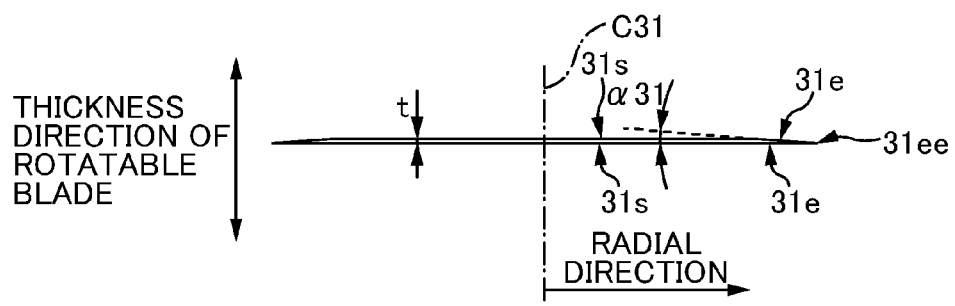
FIG. 5B is a view along arrows B-B in FIG. 5A.

FIG. 5A is a plan view of the rotatable blade 31, and FIG. 5B is a view along arrows B-B in FIG. 5A. Furthermore, FIG. 5A also shows an enlarged view of part of the cutting edge of the rotatable blade 31.

The main body of the rotatable blade 31 is a disc-like plate having a perfect circular shape and of a predetermined thickness. Furthermore, in this example, the rotatable blade 31 is made of tungsten carbide (WC)-based alloy as an example of cemented carbide, but the invention is not limited thereto. For example, stainless steel such as SUS440c, high-speed tool steel such as SKH, alloy tool steel such as SKS, and the like may be used. However, it is desirable that the rotatable blade 31 is made of cemented carbide. This is because materials other than cemented carbide have poor wear resistance and their cutting performance deteriorate relatively early. This aspect will be described later.

The diameter of the rotatable blade 31 is selected in the range of 100 mm to 200 mm for example, and is 150 mm in this example. Furthermore, a thickness t is selected in the range of 0.2 mm to 5 mm for example, and is 1 mm in this example. The rotatable blade 31 has blade faces 31s whose normal direction is along the MD direction. An outer circumferential edge portion 31e of the blade face 31s has an annular-shaped tapered face that is coaxial with the rotation shaft C31. Due to the tapered face, the thickness of the outer circumferential edge portion 31e is gradually reduced toward the outer side in the radial direction. That is to say, the outer circumferential edge portion 31e has a tapered shape in which the thickness is reduced toward the outer side in the radial directions as shown in FIG. 5B. Thus, the thickness of the cutting edge is smallest at an edge 31ee of the outer circumferential edge portion 31e.

Here, in the example in FIG. 5B, such a tapered face in the form of a ring is formed only on one of the blade faces 31s on both sides of the rotatable blade 31. The other blade face 31s is flat throughout the entire face. However, the invention is not limited thereto. In some cases, a tapered face may be formed on both of the blade faces 31s. However, in order to improve the machining accuracy in processing of the blade faces, it is desirable that only one of the blade faces 31s is flat as in the example in FIG. 5B, because this configuration makes it easy to process the cutting edge into a target shape.

Furthermore, it is preferable that an angle α31 of the cutting edge is set to any value larger than 0° and equal to or less than 20°, that is, the angle α31 between the outer circumferential edge portions 31e of one blade face 31s and the other blade face 31s is set as mentioned above. This is because a good cutting performance can be achieved with angles in this range. Furthermore, if the angle α31 is 15° or more, it is possible to suppress significant damage (fractures) in the cutting edge during polishing, which easily occurs to a blade made of cemented carbide. This aspect will be described later.

As shown in the enlarged view in FIG. 5A, a plurality of recess portions 31d, 31d, . . . are formed on the cutting edge along the circumferential direction of the rotatable blade 31. The recess portions 31d penetrate through the rotatable blade 31 substantially in the thickness direction, and their depth directions match the radial directions of the rotatable blade 31. In this example, the recess portions 31d each have a depth more than 2 μm and less than 5 μm, but the invention is not limited thereto. However, it is desirable that the depth is more than 2 μm because the cutting performance can be significantly improved. This aspect will be described later.

Furthermore, all the recess portions 31d may or may not have the same shape that is targeted to be a predetermined designed shape. Examples of the designed shape include a saw blade shape. In this case, the plurality of recess portions 31d having the same shape are repeatedly formed in some pattern (e.g., at a predetermined pitch) in the circumferential direction of the rotatable blade 31.

Note that, in the example in FIG. 5A, the recess portions 31d are formed through a process in which part of the outer circumferential edge 31ee having a perfect circular shape are cut off from the rotatable blade 31. That is, the recess portions 31d are recessed radially inwardly from an extrapolated line 31ee1 of the outer circumferential edge 31ee of the rotatable blade 31, the outer circumferential edge 31ee being around the recess portions 31d. Accordingly, in this example, as shown in FIG. 5A, the recess portions 31d have irregular shapes that are not a designed shape, and basically do not have a specific pattern also in the circumferential direction. Accordingly, the recess portions 31d according to the invention are defined, for example, as follows. That is to say, the recess portion 31d is a portion which is recessed radially inwardly from the outer circumferential edge 31ee having a perfect circular shape as prescribed according to the radius of the rotatable blade 31.

With these recess portions 31d on the cutting edge of the rotatable blade 31, the following two cutting effect are achieved: a cutting effect by sliding of the cutting edge due to the rotational driving of the rotatable blade 31; and a cutting effect by the recess portions 31d catching and breaking tows. The cutting performance is significantly improved compared with a flat blade that has no recess portion 31d.

However, as described above, when the tows deeply enter into the recess portions 31d, molten residue of the tows easily adheres to portions near the recess portions 31d. Thus, there is a possibility that the molten residue is accumulated on the cutting edge and covers it. Accordingly, there is a possibility that the cutting performance that was good at the onset of use may deteriorate relatively early. Thus, in the rotatable blade 31 of the first embodiment, predetermined conditions are set up on the size of the recess portions 31d in order to make it difficult for the tows to enter into the recess portions 31d.

Figure 6:
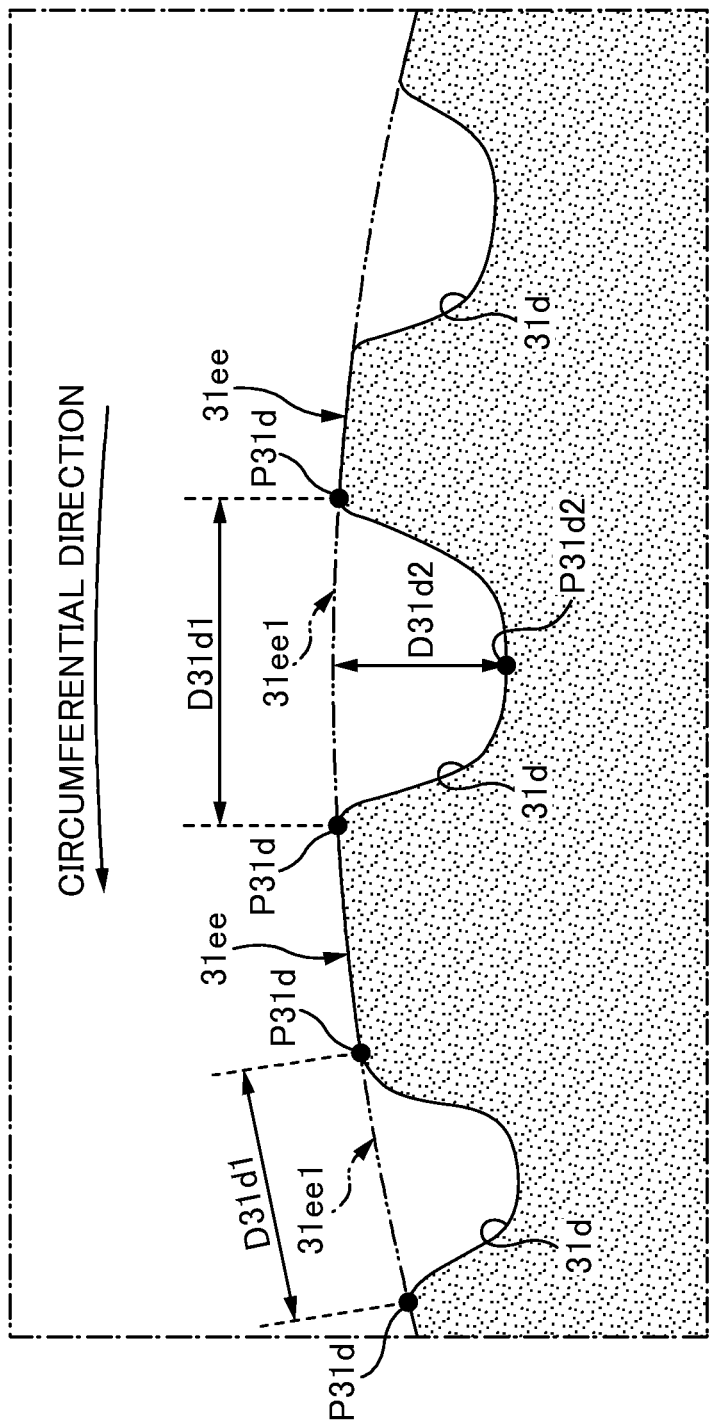
FIG. 6 is an enlarged view of part of the cutting edge of the rotatable blade 31.

FIG. 6 is an explanatory diagram thereof, showing the same view as the enlarged view of part of the cutting edge in FIG. 5A. In the first embodiment, the size conditions of the recess portions 31d are prescribed using the lengths in the circumferential direction of the recess portions 31d. That is to say, the shape of the recess portions 31d is set up so that the mean value (arithmetic mean) of the lengths in the circumferential direction of all recess portions 31d formed in the rotatable blade 31 is smaller than the mean value (arithmetic mean) of the diameters of the tows contained in the semi-finished product 1a.

With this setting, it is difficult for the tows to enter into the recess portions 31d during cutting of the semi-finished product 1a. Also, adhesion of molten residue of the tows to portions near the recess portions 31d can be effectively suppressed, and the molten residue of the tows can be effectively prevented from being accumulated on the cutting edge. This makes it possible to prevent the cutting performance from deteriorating due to accumulation of the molten residue. In addition, the maintenance cycle of the rotatable blade 31 can be made longer, which improves the productivity of the cleaning web members 1.

The mean value of the lengths in the circumferential direction of the recess portions 31d is determined as follows. First, as shown in FIG. 6, the cutting edge of the rotatable blade 31 is magnified with a microscope or the like. A pair of positions P31d and P31d are obtained at which the recess portion 31d starts to separate from the outer circumferential edge 31ee of the rotatable blade 31 and the extrapolated line 31ee1 thereof. And, a linear distance D31d1 between the pair of positions P31d and P31d is measured as the length of the recess portion 31d in the circumferential direction. This measurement is performed for all recess portions 31d formed in the rotatable blade 31. Then, arithmetic mean of the measured lengths of the recess portions 31d in the circumferential direction is obtained (that is, a sum is obtained by adding the measured lengths of all recess portions 31d in the circumferential direction, and this sum is divided by the total number of the recess portions 31d used for the addition). Thus, the mean value of the lengths in the circumferential direction of the recess portions 31d is calculated.

In consideration of the fact that the diameters of the tows contained in the semi-finished product 1a are 18 to 25 μm (or about 6 to 60 μm), it is desirable that very small recess portions 31d having a length in the circumferential direction of 1 μm or less among the recess portions 31d are excluded from the measurement. That is to say, it is preferable to selectively measure only relatively large recess portions 31d having a length in the circumferential direction of more than 1 μm among the recess portions 31d. In that case, the calculated mean value more accurately represents the lengths in the circumferential direction of large recess portions 31d into which the tows easily enter on the rotatable blade 31. As a result, the mean value of the lengths in the circumferential direction of the recess portions 31d more accurately expresses the level of difficulty for the tows in entering into the recess portions.

Meanwhile, the mean value of the diameters of the tows in the semi-finished product 1a is determined as follows. First, a diameter of a tow is measured at a plurality of points at equal intervals in the longitudinal direction of the tow. Then, the mean value of the diameters of this tow is obtained by obtaining the arithmetic mean of the measured values. This measurement is performed for all tows contained in the semi-finished product 1a. Then, by obtaining the arithmetic mean of all mean values obtained for the respective tows, the mean value of the diameters of the tows in the semi-finished product 1a is calculated.

However, according to statistics, it is not necessary to take all recess portions 31d and all tows as the population to calculate the mean values. That is to say, regarding the recess portions 31d, it is sufficient that the same number of recess portions 31d as provides sufficient statistical accuracy are sampled at random from all recess portions 31d formed in the rotatable blade 31, and that only these sampled recess portions 31d are used as the population to calculate the mean value of the lengths of the recess portions 31d in the circumferential direction. Furthermore, in a similar manner, also regarding the tows, it is sufficient that the same number of tows as provides sufficient statistical accuracy are sampled at random from all tows contained in the semi-finished product 1a, and that only these sampled tows is used as the population to calculate the mean value of the diameters of the tows. Here, this approach is more realistic than taking all recess portions 31d and all tows as the population.

Note that, if the lateral cross-sections of the tows are not a precise circle, a mean diameter in the lateral cross-section of the tows, that is, a mean value of a largest diameter and a smallest diameter in the lateral cross-section of the tows may be taken as the diameter of the tows. However, in some cases, a mean diameter calculated using Formula 1 below may be taken as a diameter of the tows.

$$\text{Mean diameter of tows (m)} = 2 \times \sqrt{(W/(\rho \times L \times \pi))} \quad (1)$$

In Formula 1 above, W refers to the weight (g) of the tows, ρ refers to the density (g/m$^3$) of the tows, and L refers to the total length (m) of the tows.

Furthermore, it is more desirable that the shape of the recess portions 31d is set such that the mean value (arithmetic mean) of the lengths in the circumferential direction of all recess portions 31d formed in the rotatable blade 31 is smaller than the minimum value of the diameters of the tows contained in the semi-finished product 1a. In that case, the level of difficulty for the tows in entering into the recess portions 31d can be further increased, and adhesion of molten residue of the tows to the cutting edge can be more effectively suppressed.

Incidentally, if the conditions on the size of the recess portions 31d are prescribed using the mean value of the lengths in the circumferential direction of the recess portions 31d as described above, the recess portions 31d on the cutting edge of the rotatable blade 31 may include those having a length in the circumferential direction larger than the diameter of the tows, and the tows may enter into these recess portions 31d. In this case, it seems that, as the entering depth of the tows into the recess portions 31d increases, the level of difficulty for the tows in escaping from the recess portions 31d increases, and the period during which the tows may be in contact with the recess portions 31d increases, and, thus, molten residue of the tows more easily adheres to portions near the recess portions 31d.

Accordingly, it is desirable that the shape of the recess portions 31d is set so that the mean value of the depths of all recess portions 31d formed in the rotatable blade 31 is smaller than the mean value of the diameters of the tows contained in the semi-finished product 1a. With this setting, even if a recess portion 31d having a circumferential length larger than the diameter of the tows exist on the cutting edge and the tows enter into that recess portion 31d, the entering depth of the tows into the recess portions 31d is small. Thus, the tows can be released from the recess portions 31d in a relatively short time. Accordingly, adhesion of molten residue of the tows to portions near the recess portions 31d can be effectively suppressed. The molten residue of the tows can be effectively prevented from being accumulated on the cutting edge.

The mean value of the depths of the recess portions 31d is determined as follows. First, as shown in FIG. 6, the cutting edge of the rotatable blade 31 is magnified with a microscope or the like. A position P31d2 in the recess portion 31d is obtained that is radially farthest from the extrapolated line 31ee1 of the outer circumferential edge 31ee of the rotatable blade 31. And, a linear distance D31d2 in the radial direction between the position P31d2 and the extrapolated line 31ee1 of the outer circumferential edge 31ee is measured as the depth of the recess portion 31d. This measurement is performed for all recess portions 31d formed in the rotatable blade 31. Then, arithmetic mean of the measured depths of the recess portions 31d is obtained (i.e., a sum is obtained by adding the measured depths of all recess portions 31d, and the sum is divided by the total number of recess portions 31d used for the addition). Thus, the mean value of the depths of the recess portions 31d is calculated.

As in the length in the circumferential direction described above, in consideration of the fact that the diameters of the tows are 18 to 25 μm (or about 6 to 60 μm), it is desirable that very small recess portions 31d having a depth of 1 μm or less among the recess portions 31d are excluded from the measurement. That is to say, it is preferable that only relatively large recess portions 31d having a depth of more than 1 μm among the recess portions 31d are selectively measured. In that case, the calculated mean value more accurately represents the depths of large recess portions 31d into which the tows easily enter on the rotatable blade 31. As a result, the mean value of the depths of the recess portions 31d more accurately expresses the level of how easily the tows that have entered into the recess portions 31d is released therefrom.

Also as in the length in the circumferential direction described above, according to statistics, it is not necessary to take all recess portions 31d as the population to calculate the mean value of the depths. That is to say, it is sufficient that the same number of recess portions 31d as provides sufficient statistical accuracy are sampled at random, and that only these sampled recess portions 31d are taken as the population to calculate the mean value of the depths of the recess portions 31d.

Furthermore, it is more desirable that the shape of the recess portions 31d is set so that the mean value (arithmetic mean) of the depths of all recess portions 31d formed in the rotatable blade 31 is smaller than the minimum value of the diameters of the tows contained in the semi-finished product 1a. This can increase the level of how easily the tows that have entered into the recess portions 31d is released from the recess portions 31d. Adhesion of molten residue of the tows to the cutting edge can be more effectively suppressed.

The regulating member 50 includes: an upstream pressing member 51 that is disposed corresponding to the upstream belt conveyor 21; and a downstream pressing member 55 that is disposed corresponding to the downstream belt conveyor 25. Throughout the period during which the semi-finished product 1a is being cut, the upstream pressing member 51 presses the semi-finished product 1a against the upstream belt conveyor 21, at a position upstream from the rotatable blade 31 in the MD direction. Furthermore, throughout the period during which the semi-finished product 1a is being cut, the downstream pressing member 55 presses the semi-finished product 1a against the downstream belt conveyor 25 at a position downstream from the rotatable blade 31 in the MD direction (see the state indicated by the broken line in FIG. 4A). Accordingly, the movement of the semi-finished product 1a during cutting is effectively regulated. Thus, the stability in the cutting operation is improved, which results in achievement of a good cutting performance.

The upstream pressing member 51 includes: a pair of rollers 53a and 53b that are arranged in the MD direction; and an endless belt 54 that is wrapped around the pair of rollers 53a and 53b. The endless belt 54 is disposed so that its outer circumferential face opposes the outer circumferential face of the endless belt 24 of the upstream belt conveyor 21 functioning as a transport surface. These endless belts 24 and 54 gently presses from both sides in the thickness direction the semi-finished product 1a that is positioned between the outer circumferential faces of the endless belts. The endless belt 54 of the upstream pressing member 51, in conjunction with the intermittent transport operation by the upstream belt conveyor 21, performs a revolving operation intermittently in the same operation pattern as this intermittent transport operation. Accordingly, the semi-finished product 1a is stably transported in the MD direction intermittently by the transport amount corresponding to the product pitch P1; whereas, when the rotatable blade 31 cuts the semi-finished product 1a during a transport suspension, the movement of the semi-finished product 1a is effectively regulated at a position upstream from the rotatable blade 31 in the MD direction. Thus, a good cutting performance is achieved. The revolving operation of the upstream pressing member 51 in conjunction with this intermittent transport operation is realized, for example, by obtaining the driving force of the revolving operation from the servomotor that serves as the driving source for the upstream belt conveyor 21, via an appropriate power transmission mechanism such as a gear train or an endless-belt power transmission device. However, the invention is not limited thereto. For example, an additional servomotor may be provided for driving the revolving operation of the upstream pressing member 51, and this servomotor may be controlled in synchronization with the intermittent transport operation of the upstream belt conveyor 21.

Meanwhile, as in the upstream pressing member 51 described above, the downstream pressing member 55 also includes: a pair of rollers 57a and 57b that are arranged in the MD direction; and an endless belt 58 that is wrapped around the pair of rollers 57a and 57b. The endless belt 58 is disposed so that its outer circumferential face opposes the outer circumferential face of the endless belt 28 of the downstream belt conveyor 25 functioning as a transport surface. However, the endless belt 58 of the downstream pressing member 55 is supported so as to oscillate about a shaft C55 along the CD direction as the center of the oscillation. At the time of cutting during a transport suspension, counterclockwise revolution of the endless belt 58 shown in FIG. 4A brings an upstream end portion 58b of the endless belt 58 into contact with the semi-finished product 1a as indicated by the broken line in FIG. 4A, the upstream end portion 58b being located upstream in the MD direction. Thus, the semi-finished product 1a is pressed against the outer circumferential face of the endless belt 28 of the downstream belt conveyor 25. Accordingly, the movement of the semi-finished product 1a during cutting is regulated also at a position downstream from the rotatable blade 31, and a good cutting performance is ensured. On the other hand, clockwise revolution of the endless belt 58 shown in FIG. 4A during transport makes the upstream end portion 58b of the endless belt 58 become in a withdrawn state as indicated by the solid line in FIG. 4A, in which it is located at a greater distance from the endless belt 28 of the downstream belt conveyor 25 than in the above-described pressing state (the state indicated by the broken line). This enlarges the space between the downstream belt conveyor 25 and the downstream pressing member 55, which can prevent the semi-finished product 1a from being caught during transport.

Although not shown, as an example of the drive mechanism for this oscillation operation, provided is a configuration including: a servomotor that serves as a driving source; and a motion converting mechanism such as a crank mechanism that converts rotational motion of a rotation shaft of the servomotor into reciprocal motion and transmits it to the downstream pressing member 55. This configuration is adopted in this example, but the invention is not limited thereto. Furthermore, in this example, in order to detect a pressing state, a proximity switch 43 is provided near a position where the downstream pressing member 55 in the pressing state is located. A detection signal from the proximity switch 43 is used as a trigger signal for starting the moving operation of the rotatable blade 31 in the CD direction, which will be described later.

Furthermore, the endless belt 58 of the downstream pressing member 55 performs an intermittent revolving operation in conjunction with the intermittent transport operation by the downstream belt conveyor 25; the operation pattern of the intermittent revolving operation is substantially the same as that of the intermittent transport operation. This can more reliably prevent such a problem that the semi-finished product 1a is caught on the endless belt 58 of the downstream pressing member 55 during transport. The revolving operation of the endless belt 58 of the downstream pressing member 55 is performed by a servomotor, serving as a driving source, provided for at least one of the pair of rollers 57a and 57b. The servomotor is controlled by a controller. For example, the controller controls the servomotor based on outputs from a rotation detection sensor provided for any of the rollers 23 and 27 of the intermittent transport mechanism 20, the rotation detection sensor being a device such as a rotary encoder. Accordingly, the intermittent revolving operation of the endless belt 58 of the downstream pressing member 55 is realized in conjunction with the above-described intermittent transport operation.

Furthermore, in the example in FIG. 4A, also during transport of the semi-finished product 1a, the outer circumferential face of the endless belt 58 of the downstream pressing member 55 is maintained in a inclined state with respect to the outer circumferential face of the endless belt 28 of the downstream belt conveyor 25 (see the state indicated by the solid line in FIG. 4A). That is to say, in the endless belt 58 of the downstream pressing member 55, a downstream end portion 58a is located at a greater distance from the outer circumferential face of the downstream belt conveyor 25 than the upstream end portion 58b is. Accordingly, also during transport, the space between the downstream belt conveyor 25 and the downstream pressing member 55 is maintained in a state where it becomes wider toward the downstream side in the MD direction. Accordingly, this can reliably prevent the cleaning web member 1 from being caught on the downstream pressing member 55 even when the volume of the cleaning web member 1 formed by cutting into a single-cut sheet shape is recovered during transport to increase the thickness of the cleaning web member.

The main body of the controller is a device such as a computer or a programmable logic controller (PLC); the main body has a processor and a memory. Here, the processor reads and executes a control program stored previously in the memory, thereby controlling servomotors so that the intermittent transport mechanism 20, the rotatable blade 31, and the regulating member 50 operate in conjunction with one another, the servomotors serving as driving sources for these components 20, 31, and 50. That is to say, the configuration of the controller described here includes not only the main body such as a computer or a PLC but also an amplifier for actually performing a positional control on the servomotors.

FIGS. 7A to 7G are schematic diagrams showing how the single-cut cleaning web members 1 is produced by the cutting apparatus 10 cutting the semi-finished product 1a under the control of this controller. In each drawing, the upper portion shows a schematic side view corresponding to FIG. 4A, and the lower portion shows a schematic plan view corresponding to FIG. 4B.

In the cutting apparatus 10, as described above, during an suspension of the transport operation which is intermittently performed, the rotatable blade 31 performs alternatively either of the forward path operation or the return path operation in the CD direction so as to sequentially cut and separate the semi-finished product unit 1U at the downstream end of the semi-finished product 1a. Thus, the cleaning web members 1 is formed. Note that a series of cutting processes related to the forward path operation are the same as a series of cutting processes related to the return path operation except that the rotatable blade 31 moves in opposite directions along the CD direction. Accordingly, hereinafter, only a series of cutting processes related to the forward path operation will be described.

Figure 7A:
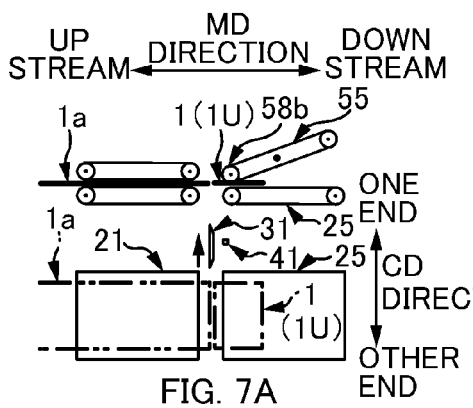

FIG. 7A shows an initial state, which is a state immediately after the rotatable blade 31 has performed a return path operation. That is to say, the rotatable blade 31 has crossed the semi-finished product 1a in the CD direction and is positioned at the one side end in the CD direction. With this crossing, the semi-finished product unit 1U at the most downstream end of the semi-finished product 1a has been separated by cutting, and the single-cut cleaning web member 1 is formed.

Note that, at this stage, the upstream end portion 58b of the downstream pressing member 55 is still pressing the cleaning web member 1 against the downstream belt conveyor 25. If the semi-finished product 1a is transported in the MD direction in this state, this may cause such a trouble that the semi-finished product 1a is caught on the upstream end portion 58b of the downstream pressing member 55, which makes it difficult for the semi-finished product 1a to be transferred to the downstream belt conveyor 25.

Figure 7B:
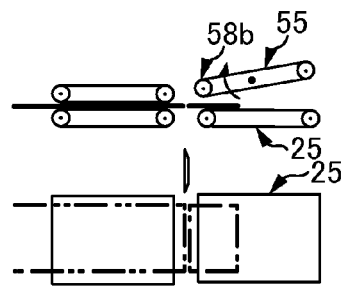
Figure 7C:
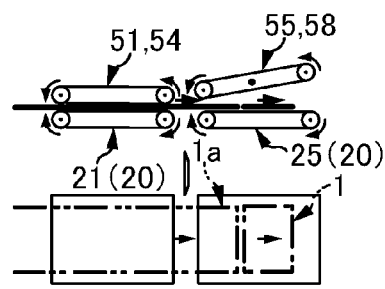

Accordingly, when the controller receives from the proximity switch 41 provided at the one side end in the CD direction a detection signal indicating that the rotatable blade 31 has reached this end, the controller causes the downstream pressing member 55 to rotate clockwise as shown in FIG. 7B. Thereby, the upstream end portion 58b moves away from the downstream belt conveyor 25, and reaches a withdrawn state in which the space between the upstream end portion 58b of the downstream pressing member 55 and the downstream belt conveyor 25 has enlarged.

Then, at the same time as a command of the clockwise rotational movement is output to the downstream pressing member 55 or when a predetermined time has elapsed after the output, the controller controls the upstream belt conveyor 21 and the downstream belt conveyor 25 which serve as the intermittent transport mechanism 20. Thereby, the semi-finished product 1a is transported by an amount corresponding to one semi-finished product unit 1U, which is the product pitch P1 (see FIG. 7C). Here, during this transport, as described above, the endless belt 54 of the upstream pressing member 51 performs the revolving operation in conjunction with the intermittent transport mechanism 20. The downstream pressing member 55 performs the above-described withdrawal operation and the endless belt 58 thereof revolves in conjunction with the intermittent transport mechanism 20. Accordingly, This makes it possible to reliably avoid a situation in which the pressing members 51 and 55 obstruct the transport operation. Furthermore, in this example, the transport operation of the semi-finished product 1a is controlled so as to start in association with the output of a command for the clockwise rotational movement to the downstream pressing member 55. Thus, the series of cutting processes is performed at high speed, but the invention is not limited thereto. For example, it is also acceptable that an appropriate sensor such as a proximity switch is used to detect an event in which the downstream pressing member 55 has withdrawn to a predetermined position and based on this detection the transport operation is started.

Figure 7D:
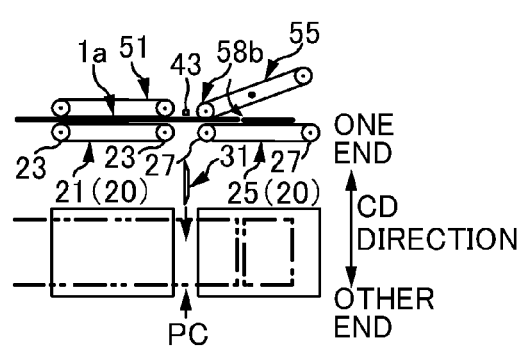

When the semi-finished product 1a has been transported by an amount corresponding to one semi-finished product unit 1U as described above, the controller suspends the transport. Then, the controller causes the downstream pressing member 55 to rotate counterclockwise as shown in FIG. 7D during this transport suspension. Thereby, the upstream end portion 58b moves toward the downstream belt conveyor 25, and reaches a state in which the upstream end portion 58b presses the semi-finished product 1a against the downstream belt conveyor 25.

A detection signal indicating that the downstream pressing member 55 is in the pressing state is transmitted to the controller from the proximity switch 43 near which the downstream pressing member 55 in the pressing state is located, for example. When the controller receives this detection signal, the controller moves the rotatable blade 31 in the CD direction from the one side end to the other side end as shown in FIGS. 7D to 7F, so that the cutting edge of the rotatable blade 31 cuts the semi-finished product 1a.

Here, as described above, the cutting is performed by the rotatable blade 31 moving in the CD direction while being driven and rotated about its center. Accordingly, a good cutting performance can be achieved. Furthermore, since a good cutting performance is achieved, the rotatable blade 31 does not have a receiver blade against which the semi-finished product 1a is to be pressed by the rotatable blade 31 during cutting. This can reliably prevent tows from being attached at the target cut position PC by welding or compression-bonding, which may occur during pressing. Furthermore, since a receiver blade is not provided, the cutting edge of the rotatable blade 31 is brought into contact only with the semi-finished product 1a during cutting. This can suppress wear of the rotatable blade 31.

Figure 7E:
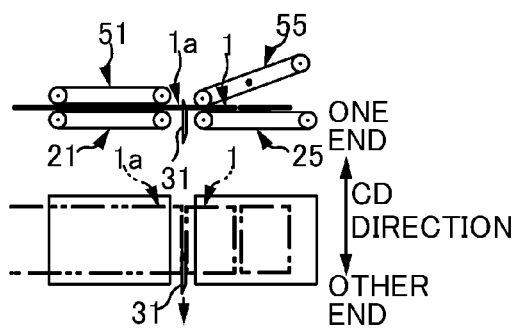
Figure 7F:
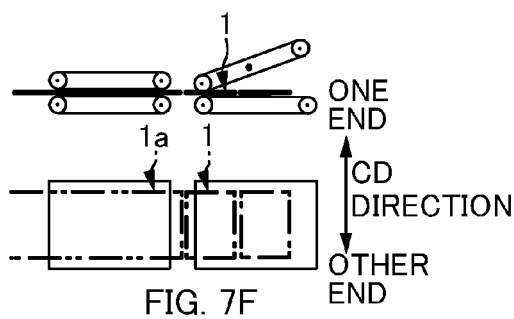

Furthermore, as shown in FIGS. 7D and 7E, at the time of cutting, the upstream pressing member 51 presses the semi-finished product 1a against the upstream belt conveyor 21 at a position upstream in the MD direction from the target cut position PC; at this stage, the upstream belt conveyor 21 suspends its transport operation, Furthermore, the downstream pressing member 55 presses the semi-finished product 1a against the downstream belt conveyor 25 at a position downstream in the MD direction from the target cut position PC; at this stage, the downstream belt conveyor 25 suspends its transport. Thus, the movement of the semi-finished product 1a during the cutting is reliably regulated. This makes it possible to effectively prevent disordered movement of the semi-finished product 1a such as wobbling of the semi-finished product 1a due to contact of the semi-finished product 1a with the rotatable blade 31 that moves in the CD direction while being driven and rotated. This also contributes to ensuring a good cutting performance.

Figure 7G:
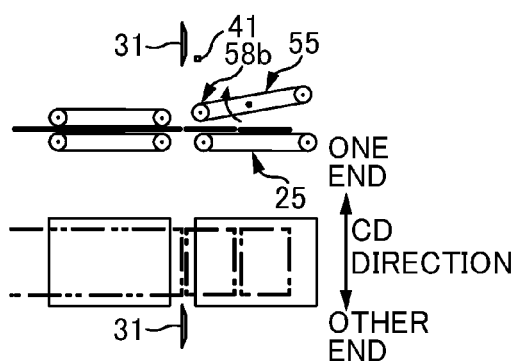

Then, a detection signal indicating that the rotatable blade 31 has reached this end is transmitted to the controller from the above-described proximity switch 41 provided at the other side end in the CD direction. When the controller receives this detection signal, the controller causes the downstream pressing member 55 to rotate clockwise as shown in FIG. 7G. Thereby, the upstream end portion 58b moves away from the downstream belt conveyor 25, and reaches a withdrawn state in which the space between the upstream end portion 58b of the downstream pressing member 55 and the downstream belt conveyor 25 has enlarged.

Here, the withdrawn state in FIG. 7G is substantially the same as the withdrawn state described with reference to FIG. 7B. Accordingly, the series of cutting processes related to the forward path operation finish at this stage. Subsequently, a series of cutting processes related to the return path operation are performed. Thereafter, the cutting processes according to the forward path operation and the cutting processes according to the return path operation are alternately repeated. Thus, a large number of cleaning webs 1 are produced from the semi-finished product 1a.

Figure 8A:
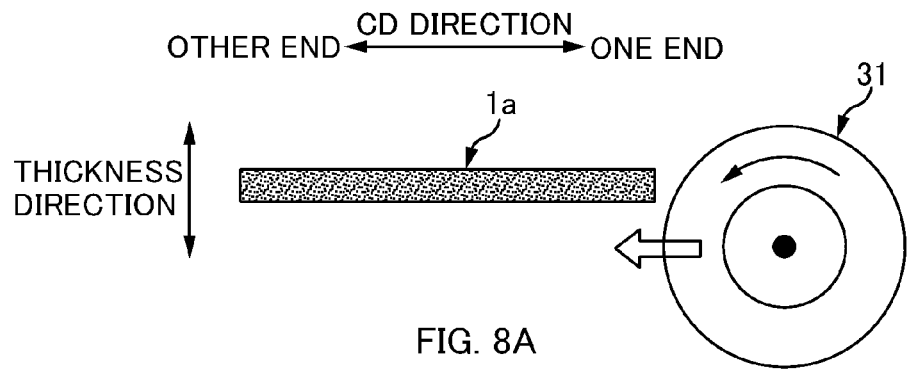
FIGS. 8A to 8C are explanatory diagrams showing how the rotatable blade 31 causes the fiber bundles 5 of tows to have high bulkiness at the same time as the cutting operation.
Figure 8B:
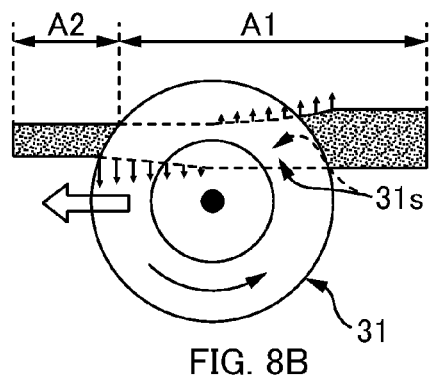
Figure 8C:
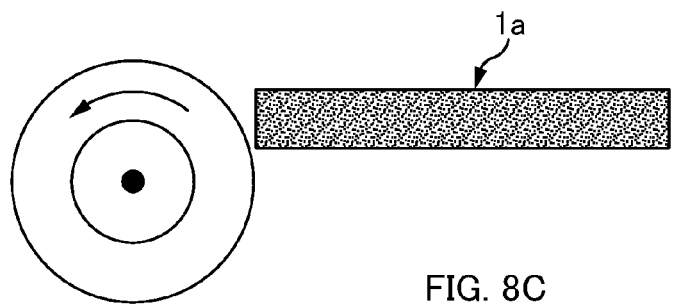
Figure 8D:
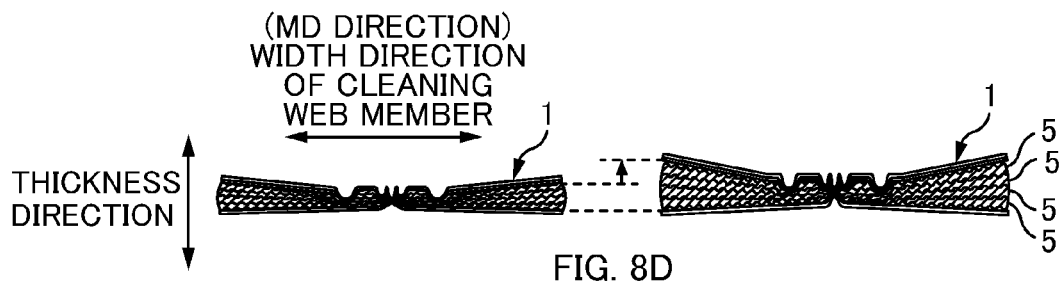
FIG. 8D shows schematic side views of the cleaning web member 1 showing a change in bulkiness caused by the rotatable blade 31.

Incidentally, if this sort of rotatable blade 31 is used, the fiber bundles 5 can have high bulkiness immediately after cutting. FIGS. 8A to 8C are explanatory diagrams showing how the rotatable blade 31 causes the fiber bundles 5 of tows to have high bulkiness at the same time as the cutting operation. The figures shows how the rotatable blade 31 moves from the one side end to the other side end in the CD direction. As shown in FIG. 8B, the semi-finished product 1a that is being cut by the rotatable blade 31 includes both a cut portion A1 which the cutting edge has already passed and an uncut portion A2 which the cutting edge has not passed yet. In this state, the blade faces 31s and 31s of the rotatable blade 31 are sequentially brought into contact with the cut portion A1. Due to rotation of the blade faces 31s and 31s, the tows in the cut portion A1 are spread and loosened in the thickness direction of the semi-finished product 1a as indicated by the short arrows in FIG. 8B. As a result, the fiber bundles 5 of tows are expanded in the thickness direction, and become very soft and bulky. Accordingly, with the cutting apparatus 10, the cleaning web member 1 is fed to the subsequent processing not in a low-bulkiness state as shown in the left portion in FIG. 8D but in a high-bulkiness state as shown in the right portion in FIG. 8D. Accordingly, it is not necessary to perform any special additional treatment for bulkiness in the subsequent processing and the like. Thus, a bulky cleaning web member 1 having high performance for trapping dust can be promptly shipped out.

In this example, the semi-finished product 1a is transported in a state in which the opposite face of the wiping face of the cleaning web member 1 is in contact with the transport surface of the intermittent transport mechanism 20; the wiping face is on the side where the strip sheet 7 and the fiber bundle member 5G are positioned, and the opposite face thereof is on the side where the auxiliary sheet 3 and the base sheet 2 are positioned. That is to say, in FIG. 4A, the strip sheet 7 and the fiber bundle member 5G are positioned above, and the base sheet 2 and the auxiliary sheet 3 are positioned below. This makes it easier to maintain high softness and bulkiness of the fiber bundle member 5G located closer to the wiping face, which also contributes to increasing the bulkiness of the cleaning web member 1.

Figure 9A:
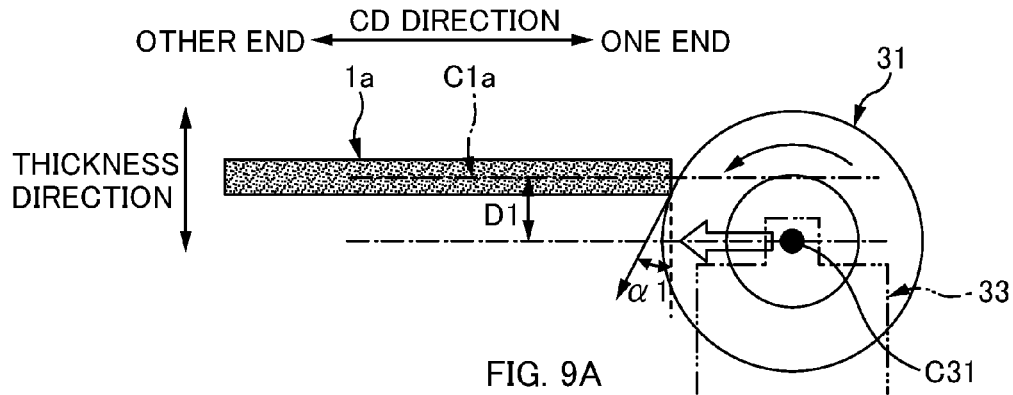
FIG. 9A is a diagram showing a positional relationship between a rotation shaft C31 of the rotatable blade 31 and a center position C1a in the thickness direction of the semi-finished product 1a according to the first embodiment.
Figure 9B:
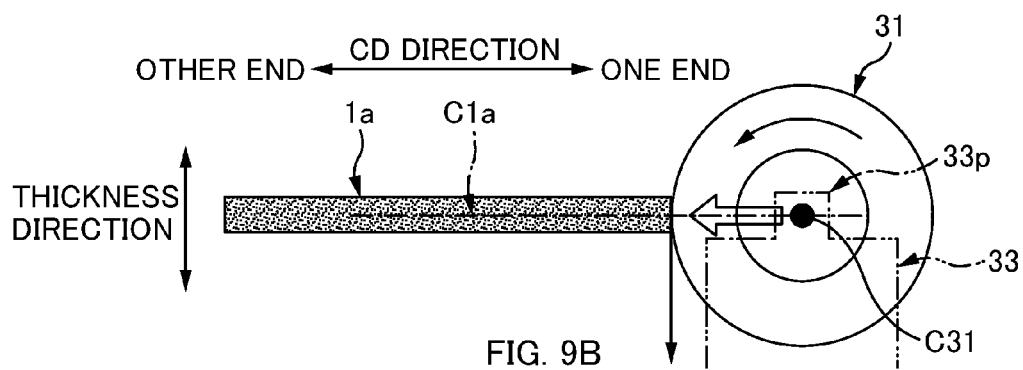
FIGS. 9B and 9C are diagrams showing a positional relationship between the rotation shaft C31 of the rotatable blade 31 and the center position C1a in the thickness direction of the semi-finished product 1a according to a comparative example.

Furthermore, as shown in FIG. 9A, in the first embodiment, the position of the rotation shaft C31 of the rotatable blade 31 is offset from a center position C1a in the thickness direction of the semi-finished product 1a by a predetermined distance D1. The reason for this is as follows. That is, if the position of the rotation shaft C31 and the center position C1a of the semi-finished product 1a match each other in the thickness direction as in the comparative example in FIG. 9B, the movement direction of the cutting edge of the rotatable blade 31 at a position where it is in contact with the semi-finished product 1a is parallel to the thickness direction of the semi-finished product 1a as shown in FIG. 9B. In this case, a large cut resistance acts on the rotatable blade 31 at the onset of cutting, and, thus, the cutting performance becomes poor. On the other hand, as shown in FIG. 9A, if the position of the rotation shaft C31 is offset from the center position C1a in the thickness direction of the semi-finished product 1a by the predetermined distance D1, the movement direction of the cutting edge at a contact position with the semi-finished product 1a at the onset of cutting is inclined at a predetermined angle α1 with respect to the thickness direction of the semi-finished product 1a. This can reduce the cut resistance at the onset of cutting, and can achieve a good cutting performance throughout the process from the start to the end of cutting.

Figure 9C:
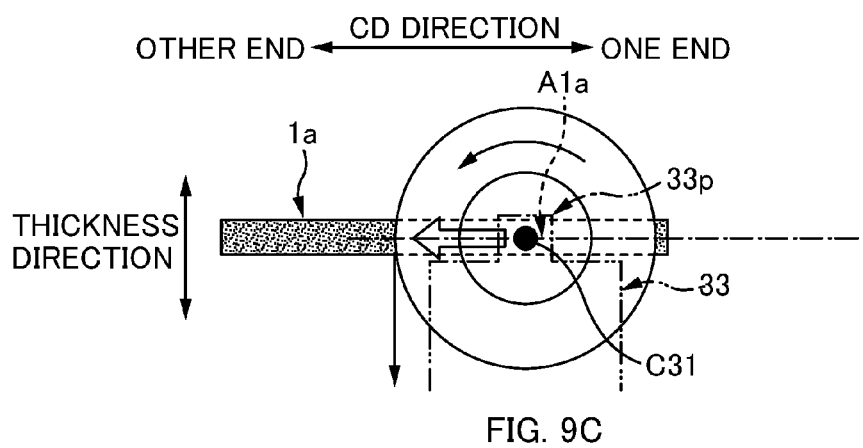

With such an offset positioning by the predetermined distance D1 as described above, the following problems are solved as well. That is to say, if the rotation shaft C31 and the center position C1a of the semi-finished product 1a match each other as in the comparative example in FIG. 9B, the rotation shaft C31 during cutting moves in the CD direction along a cut face A1a of the semi-finished product 1a as shown in FIG. 9C. However, the total thickness of the rotation shaft C31 and a shaft-related part 33p of the support platform 33 around the shaft in the MD direction is considerably larger than the thickness of the rotatable blade 31 alone because the part 33p exists at the position of the rotation shaft C31 in order to support the rotation shaft C31 as shown in FIG. 4C. Accordingly, when the rotation shaft C31 moves in the CD direction along the cut face A1a (FIG. 9C), there is a possibility that the resistance to the movement in the CD direction during cutting may increase because the part 33p, etc. are caught on the cut face A1a. This makes it difficult for the rotational blade to move at high speed in the CD direction, and lowers productivity. Also, there is a possibility that the part 33p, etc. hits hard against tows at the cut face A1a during the movement in the CD direction and the tows are damaged. However, if the position of the rotation shaft C31 is offset from the center position C1a of the semi-finished product 1a in the thickness direction by the predetermined distance D1 as shown in FIG. 9A, the part 33p of the support platform 33 around the rotation shaft C31 can be positioned away from the cut face A1a. Therefore, it is possible to avoid the interference between the part 33p and the cut face A1a. That is, these problems can be effectively prevented. Note that the size of the predetermined distance D1 is determined in consideration of the size of the part 33p such that the part 33p does not hit against the semi-finished product 1a.

Figure 10:
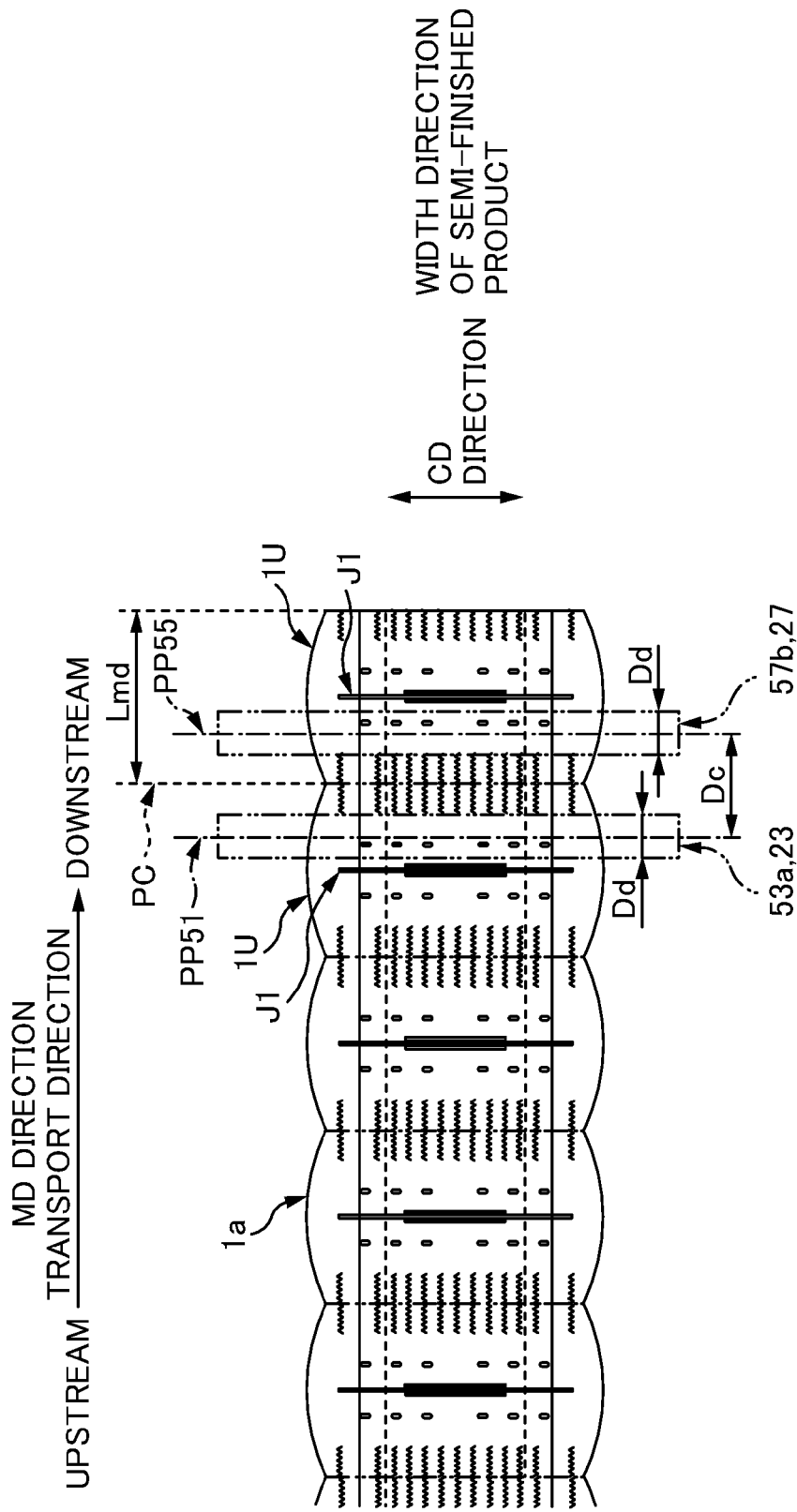

Furthermore, in order to reliably regulate movement of the semi-finished product 1a which is being cut, it is preferable that the upstream pressing member 51 and the downstream pressing member 55 are able to press positions near the target cut position PC on the semi-finished product 1a. For example, as shown in the schematic view of the semi-finished product 1a in FIG. 10, it is preferable that the press position PP55 corresponding to the downstream pressing member 55 is positioned upstream from the first welded-bonded section J1 of the semi-finished product unit 1U that is positioned at the most downstream end of the semi-finished product 1a. In addition, it is preferable that the press position PP51 corresponding to the upstream pressing member 51 is positioned downstream from the first welded-bonded section J1 of the semi-finished product unit 1U that is positioned immediately upstream of the above-mentioned semi-finished product unit 1U.

The press positions PP51 and PP55 are set at such positions, for example, as follows. First, the diameter Dd of the rollers 23, 27, 53a, and 57b related to pressing is preferably set to be smaller than a product size Lmd in the MD direction of the cleaning web member 1 (more preferably, smaller than half the product size Lmd (smaller than Lmd/2)). An inter-axis distance Dc between adjacent rollers of the rollers 23, 27, 53a, and 57b in the MD direction corresponding to each other (the distance Dc between the rotation axes), that is, the inter-axis distance Dc between the rollers 23 and 27 and the inter-axis distance Dc between the rollers 53a and 57b are each preferably set to be smaller than the product size Lmd (more preferably, smaller than the half the product size Lmd (smaller than Lmd/2)) within a range in which interference between the rollers does not occur.

Here, "the rollers 23, 27, 53a, and 57b related to pressing" described above refer to the following four rollers 23, 27, 53a, and 57b: of the pair of rollers 57a and 57b of the downstream pressing member 55, the upstream roller 57b; of the rollers 27 of the downstream belt conveyor 25, the roller 27 with which the semi-finished product 1a is sandwiched in cooperation with the roller 57b of the downstream pressing member 55; of the pair of rollers 53a and 53b of the upstream pressing member 51, the downstream roller 53a; and, of the rollers 23 of the upstream belt conveyor 21, the roller 23 with which the semi-finished product 1a is sandwiched in cooperation with the roller 53a of the upstream pressing member 51.

Furthermore, in the description above, the endless belt 58 of the downstream pressing member 55 in FIG. 4A is driven to circumferentially revolve in conjunction with the intermittent transport mechanism 20, but the invention is not limited thereto. For example, the endless belt 58 of the downstream pressing member 55 may be rotated by an idler roller, etc. In this case, in order to avoid obstructing the transport of the semi-finished product 1a, it is preferable that, in the withdrawn state in FIGS. 7B and 7C, the downstream pressing member 55 is located sufficiently away from the outer circumferential face of the endless belt 28 of the downstream belt conveyor 25 and the downstream pressing member 55 is in completely non-contact with the semi-finished product 1a. Also, in this case, it is desirable that an appropriate position detection sensor such as a proximity switch is provided at this withdrawn state position, and that control is performed such that, after the sensor detects that the downstream pressing member 55 has been withdrawn to that position, the transport operation of the semi-finished product 1a is started.

Figure 11A:
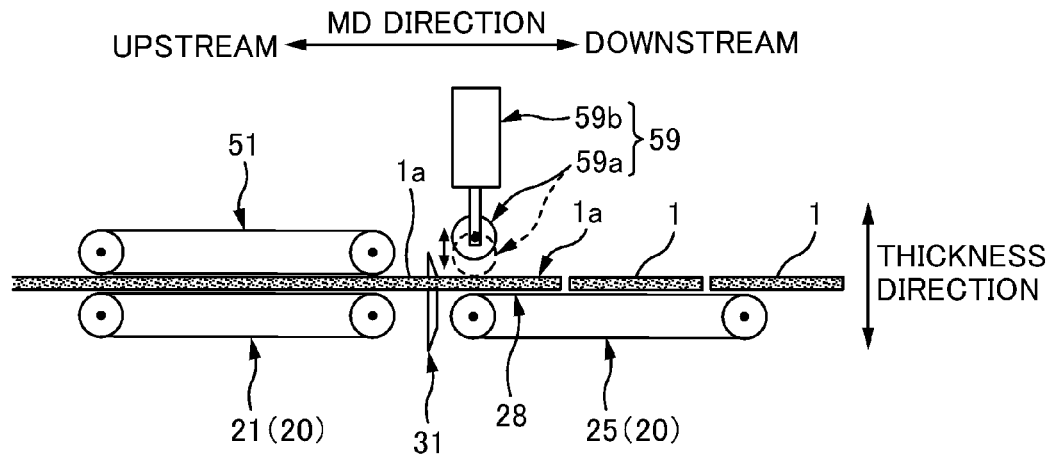
FIGS. 11A to 11C are explanatory diagrams respectively showing modified examples of the first embodiment.
Figure 11B:
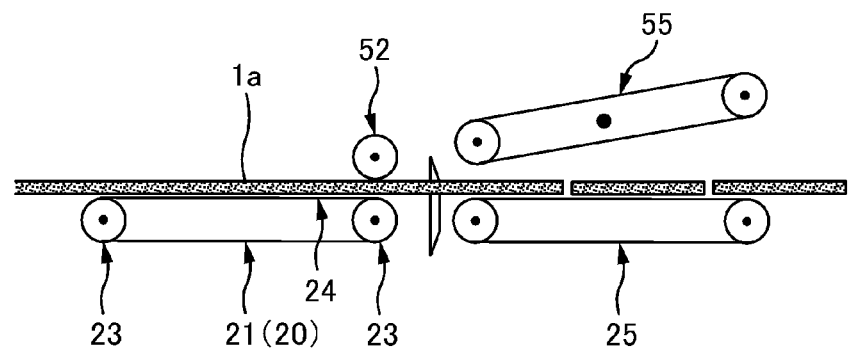
Figure 11C:
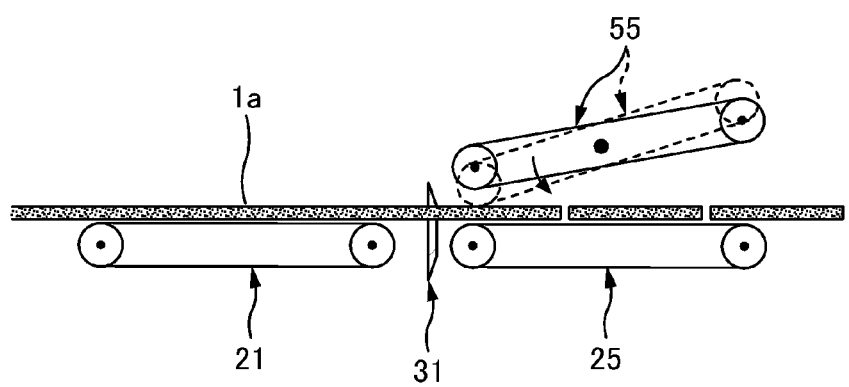

FIGS. 11A to 11C are explanatory diagrams of modified examples of the first embodiment, respectively showing schematic side views. In the description below, different aspects will be mainly described, and the same constituent components are denoted by the same reference numerals and a description thereof has been omitted.

A first modified example shown in FIG. 11A is different from the foregoing example in the configuration of the downstream pressing member 55. That is to say, a downstream pressing member 59 of this first modified example includes: one roller 59a that opposes the outer circumferential face of the endless belt 28 of the downstream belt conveyor 25; and an actuator 59b that reciprocally moves the roller 59a in the thickness direction of the semi-finished product 1a. Note that the actuator 59b is, for example, a hydraulic cylinder, an air cylinder, or the like.

With this configuration, a pressing state in which the semi-finished product 1a is pressed against the outer circumferential face of the downstream belt conveyor 25 can be obtained by moving the roller 59a toward the outer circumferential face of the downstream belt conveyor 25. And, a withdrawn state in which the space between the roller 59a and the outer circumferential face of the downstream belt conveyor 25 has increased can be obtained by moving the roller 59a in a direction in which it is away from the outer circumferential face of the downstream belt conveyor 25.

The roller 59a may be provided with a driving source such as a servomotor so as to be intermittently rotated in conjunction with the intermittent transport operation by the intermittent transport mechanism 20. Or, the roller 59a may be rotated by means such as an idler roller without being provided with a driving source.

A second modified example shown in FIG. 11B is different from the foregoing example in the configuration of the upstream pressing member 51. That is to say, an upstream pressing member 52 of this second modified example has one roller 52 that opposes the outer circumferential face of the endless belt 24 of the upstream belt conveyor 21. The roller 52 receives a pressing force applied from an appropriate pressing-force-applying mechanism, so that the roller 52 constantly presses the semi-finished product 1a against the upstream belt conveyor 21.

The roller 52 may be a drive roller that is driven to rotate, or may be an idler roller that is rotated by a rotational force obtained from the semi-finished product 1a that is in contact therewith. Note that, in the case of the drive roller, the roller 52 has to be intermittently rotated in conjunction with the intermittent transport operation of the intermittent transport mechanism 20. In this case, the roller 52 may obtain a rotational force from the driving source for the upstream belt conveyor 21 via an appropriate power transmission mechanism, or an additional driving source such as a servomotor may control the roller 52 in conjunction with the intermittent transport operation.

A third modified example shown in FIG. 11C is different from the foregoing example in that the upstream pressing member 51 has been omitted. The reason why the upstream pressing member 51 can be omitted is as follows. During cutting of the semi-finished product 1a, a downstream end portion in the semi-finished product 1a is pressed by the downstream pressing member 55 (see the state indicated by the broken line for the downstream pressing member 55 in FIG. 11C). At that time, a tensile force in the MD direction for transport is also generated on the semi-finished product 1a. Accordingly, these pressing and tensile forces regulate movement of the semi-finished product 1a during cutting. Therefore, it is not absolutely necessary for the upstream pressing member 51 to be provided. However, since the tensile force of the semi-finished product 1a decreases as the cutting in the CD direction by the rotatable blade 31 proceeds, it is desirable that the upstream pressing member 51 is provided in order to stably regulate movement of the semi-finished product 1a.

<<<Examination on Various Designs of Rotatable Blade 31>>>

In order to find various designs of the rotatable blade 31 preferable for cutting of the tows, the inventor of the present application conducted experiments in advance to discuss some of the various designs. Hereinafter, the experiments will be described.

In the experiments, the following three elements were examined: the angle $\alpha 31$ of the cutting edge of the rotatable blade 31; the material of the rotatable blade 31; and the depth of the recess portions 31d on the cutting edge. Concerning the circumferential length of the recess portion 31d on the cutting edge, it can been seen without experiments that recess portions 31d having a smaller circumferential length than the diameter of a tow makes it difficult for the tow to enter into the recess portion 31d, which suppresses adhesion of molten residue of the tow to the cutting edge. Thus, no experiment was performed for this aspect. However, a result that is in support of this assumption was obtained from an experiment (to be described later) on the depth of the recess portions 31d on the cutting edge. This result will be described later.

First, an experiment on the material of the rotatable blade 31 and the angle $\alpha 31$ of the cutting edge will be described. As shown in Table 1 in FIG. 12, four types of materials were prepared. That is to say, the following rotatable blades were prepared: rotatable blades 31 made of SUS440c as a representative of alloy tool steel; rotatable blades 31 made of SKS as a representative of alloy tool steel; rotatable blades 31 made of SKH as a representative of high-speed tool steel; and rotatable blades 31 made of tungsten carbide (WC)-based alloy as a representative of cemented carbide. Furthermore, for each material, prepared were rotatable blades 31 having the following six standards of angles $\alpha 31$ of the cutting edge: 12°, 15°, 17°, 20°, 25°, and 30°. Note that it was impossible to polish cutting edges of SKH and WC-based alloy rotatable blades to an angle of 12°. Therefore, these rotatable blades 31 were not provided. The sizes of all rotatable blades 31 were set so as to have a diameter of 150 mm and a thickness of 1 mm.

These rotatable blades 31 were each rotated about the rotation shaft C31 at a circumferential velocity of the cutting edge of 785 (m/min), the rotation shaft C31 being located at the center of the circular blade faces 31s. In this state, the rotatable blades 31 were moved in the width direction of the semi-finished product 1a, thereby cutting along the width direction the semi-finished product 1a. Note that, in this experiment, in order to evaluate the cutting performance correctly, a method is used for eliminating factors such as wear that cause deterioration in the cutting performance; that is, the rotatable blades 31 were ones immediately after polishing, and the cutting performance was checked with respect to cut faces immediately after the first cutting operation.

Table 1 shows the experimental results. Note that the results in Table 1 are based on visual observation of cut faces. "Good" indicates that a cut face was good, in particular, that the cut face was in a finely cut state with no uncut portion or torn-off portion. "Poor" indicates that a cut face was poor, in particular, that the cut face had an uncut portion. Further, "Fair" indicates that a cut face was in a state between Good and Poor, in particular, that the cut face had no uncut portion but partially had a torn-off portion.

As can be seen from Table 1, without taking the material into consideration, a good cutting performance was achieved generally when the angle $\alpha 31$ of the cutting edge was 12° to 20°. Furthermore, although not shown in Table 1, it was seen that the cutting performance of the SUS440c, SKS, and SKH rotatable blades started to deteriorate approximately when the number of times of cutting operations reached 50. Whereas, the cutting performance of the WC-based alloy rotatable blades was kept high even when the number of times of cutting operations increased.

Based on these results, in order to achieve and maintain a high cutting performance, it is preferable that the rotatable blade 31 is made of cemented carbide and that the angle $\alpha 31$ of the cutting edge is set at 15° to 20°. Based on these findings, the rotatable blade 31 of the first embodiment is set to have such designs.

Next, an experiment on the depth of the recess portions 31d on the cutting edge will be described. As shown in Table 2 in FIG. 12, four standards are used in the depth of the recess portions 31d on the cutting edge. That is to say, the following four types of rotatable blades 31 were prepared: a rotatable blade 31 with the recess portions 31d having a depth of 2 μm or less; a rotatable blade 31 with the recess portions 31d each having a depth of more than 2 μm and less than 5 μm; a rotatable blade 31 with the recess portions 31d each having a depth of 5 μm or more and less than 10 μm; and a rotatable blade 31 with the recess portions 31d each having a depth of 10 μm or more and less than 20 μm. Note that, based on the above-described findings, all of the rotatable blade 31 were made of WC-based alloy and had an angle α31 of the cutting edge of 20°. Furthermore, the mean value of the diameters of the tows contained in the semi-finished product 1a that was subjected to the cutting was 16 μm. In this experiment, the cutting performance was checked when the number of times of cutting operations reached 500 and 1000.

Table 2 shows the experimental results. If the depth of the recess portions 31d was 2 μm or less, the cutting performance was not so good. But, if the depth was more than 2 μm, the cutting performance was good. It can be considered that this is because the recess portions 31d having too small depth reduces the effect of the recess portions 31d catching and cutting tows, which results in low cutting performance. Based on these findings, in the first embodiment, the depth of the recess portions 31d is set to be more than 2 μm.

Here, when the cutting performance was checked, the state of molten residue adhering to the cutting edge was also observed. Table 2 also shows the observation results. As can be seen from Table 2, molten residue adhered to the cutting edge if the depth of the recess portions 31d was 5 μm or more. It can be considered that this is because the recess portions 31d having large depth makes it difficult for tows that have enter into these recess portions 31d to be released from the recess portions 31d, which causes molten residue of the tows to easily adhere to the cutting edge. Note that this fact is in support of the assumption that molten residue of the tows more easily adheres to the cutting edge as the tows more easily enter into the recess portions 31d. That is to say, it can be considered that this fact is in support of the description at the beginning of this section "recess portions 31d having a smaller circumferential length than the diameter of a tow makes it difficult for the tow to enter into the recess portion 31d, which suppresses adhesion of molten residue of the tow to the cutting edge".

—Second Embodiment—

FIG. 13A is a schematic side view of a cutting apparatus 10a of a second embodiment, FIG. 13B is a view along arrows B-B in FIG. 13A, and FIG. 13C is a view along arrows C-C in FIG. 13A.

The second embodiment is different from the first embodiment mainly in that the movement direction of the rotatable blade 31 in the cutting apparatus 10a is not along the CD direction but along the thickness direction of the semi-finished product 1a (corresponding to an intersecting direction). Portions other than the above are substantially similar to those in the first embodiment. Accordingly, in the description below, the same sign is used for the same configurations as the first embodiment, and description thereof is omitted.

During a transport suspension of the semi-finished product 1a, the rotatable blade 31 in the cutting apparatus 10a moves from the one side to the other side in the thickness direction of the semi-finished product 1a or moves from the other side to the one side in the thickness direction while being driven and rotated about the rotation shaft C31 along the MD direction. The cutting edge of the rotatable blade 31 that is being driven and rotated cuts the semi-finished product 1a during the movement. Hereinafter, the thickness direction of the semi-finished product is also simply referred to as a "thickness direction".

The rotatable blade 31 is reciprocally moved as follows. First, a support platform 33a that supports the rotatable blade 31 in a rotatable manner is guided so as to be reciprocally movable in the thickness direction along an appropriate guide member 35a such as a linear guide. The support platform 33a is reciprocally moved in the thickness direction of the semi-finished product 1a by an appropriate drive mechanism (not shown). Each stroke distance in the forward path and the return path according to the reciprocal movement is set to a distance that allows the entire rotatable blade 31 to cross the semi-finished product 1a throughout in the thickness direction. Furthermore, the drive mechanism (not shown) that moves the rotatable blade 31 in the thickness direction includes: for example, a pair of pulleys that are arranged in the thickness direction; an endless timing belt that is wrapped around the pair of pulleys; and a servomotor as a driving source that rotates the pulleys. Part of the endless timing belt is secured to the support platform 33a. Accordingly, when the servomotor repeatedly rotates clockwise and anti-clockwise, the rotatable blade 31 is reciprocally moved in the thickness direction.

Incidentally, in this example, as shown in FIGS. 13B and 13C, the rotation shaft C31 of the rotatable blade 31 is located outside an edge 1ae of the semi-finished product 1a in the CD direction. The reason for this is similar to that described in the foregoing first embodiment. That is to say, this arrangement is for preventing apart 33ap of the support platform 33a from interfering with the semi-finished product 1a during cutting, which results in obstructing smooth cutting. The radius R31 of the rotatable blade 31 is set at a larger value than Rs that is calculated using the following Formula 2 so that the semi-finished product 1a can be cut throughout the entire width even when the rotation shaft C31 is significantly separated in the CD direction from a center position M1a of the semi-finished product 1a as mentioned above.

$Rs$=(Width $W1a$ of Semi-finished product $1a$)+(Distance $DC31$ in CD direction between Edge $1ae$ of Semi-finished product $1a$ and Rotation shaft $C31$) (2)

Figure 14B:
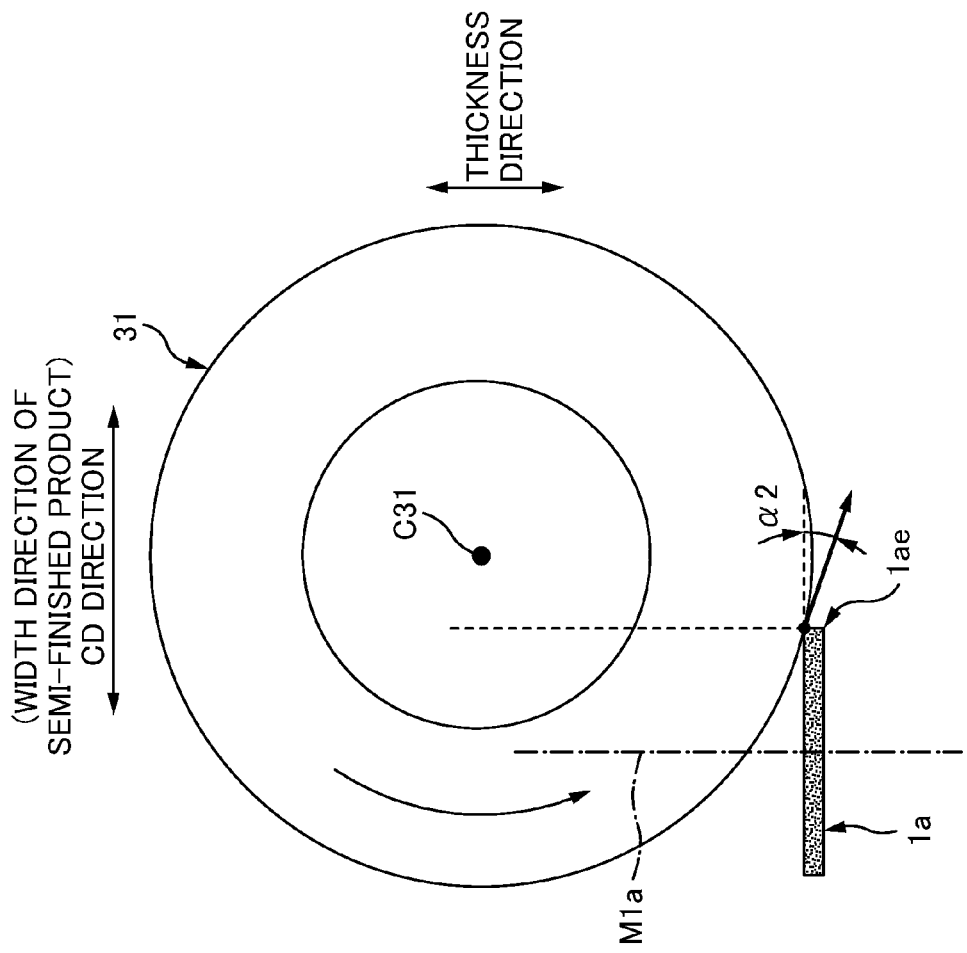
FIG. 14B is a diagram showing a positional relationship between the rotation shaft C31 of the rotatable blade 31 and the center position M1a in the width direction of the semi-finished product 1a according to the second embodiment.
Figure 14A:
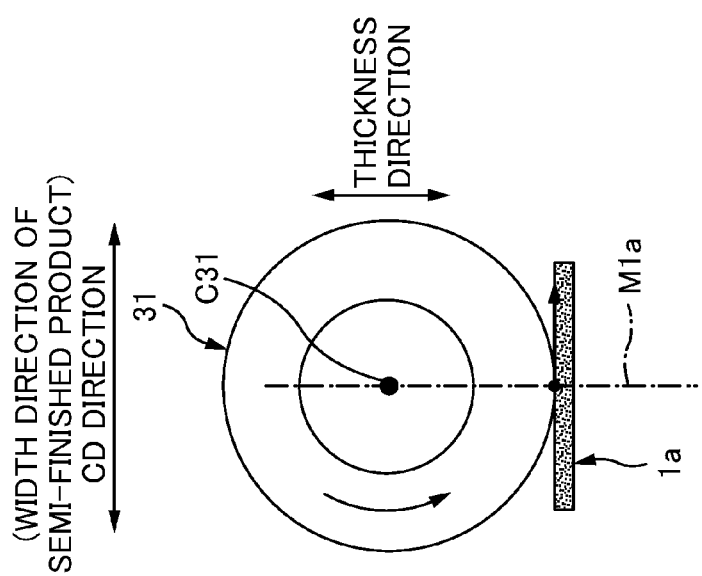
FIG. 14A is a diagram showing a positional relationship between the rotation shaft C31 of the rotatable blade 31 and a center position M1a in the width direction of the semi-finished product 1a according to a comparative example.

Such a separate arrangement also achieves an effect of an improved cutting performance at the onset of cutting. FIGS. 14A and 14B are explanatory diagrams thereof. In a comparative example in FIG. 14A, the position of the rotation shaft C31 of the rotatable blade 31 matches the center position M1a in the CD direction of the semi-finished product 1a, that is, these positions are the same in the CD direction. In this case, at the onset of cutting as shown in FIG. 14A, the movement direction along which the cutting edge of the rotatable blade 31 moves at a position where it is in contact with the semi-finished product 1a is parallel to the width direction (the CD direction) of the semi-finished product 1a. Accordingly, a large cut resistance acts on the rotatable blade 31 at the onset of cutting, and, thus, the cutting performance becomes poor. On the other hand, if the rotation shaft C31 of the rotatable blade 31 is located outside the edge 1ae of the semi-finished product 1a in the CD direction as shown in FIG. 14B, the movement direction of the cutting edge at a position where it is in contact with the semi-finished product 1a forms a certain inclination angle α2 with respect to the width direction (the CD direction) of the semi-finished product 1a from the onset of cutting. This can reduce the cut resistance at the onset of cutting, and can achieve a good cutting performance throughout the process from the start to the end of cutting.

Note that, as is clear from a comparison between FIGS. 4B and 13B, according to the second embodiment, the size of the rotatable blade 31 is larger than that in the first embodiment.

Therefore, the first embodiment is more desirable in order to reduce the size of the rotatable blade 31.

—Other Embodiments—

While the automatic urine disposal apparatus is described as the defecation/urination determination apparatus of the present invention with reference to the preferred embodiment, the embodiment is for the purpose of elucidating the understanding of the invention and is not to be interpreted as limiting the invention. The invention can of course be altered and improved without departing from the gist thereof, and equivalents are intended to be embraced therein.

In the foregoing embodiments, the semi-finished product 1a according to the cleaning web member 1 is shown as an exemplary web member, but the invention is not limited thereto. That is to say, any web member may be applied as long as it has a plurality of fibers including tows and it is continuous in the transport direction.

In the foregoing embodiments, during a transport suspension of the semi-finished product 1a that is intermittently transported in the MD direction, the rotatable blade 31 that is being driven and rotated moves in the CD direction, thereby cutting along the CD direction the semi-finished product 1a. However, the invention is not limited thereto. For example, the semi-finished product 1a may be cut at the product pitch P1 by relatively moving the rotatable blade 31 with respect to the semi-finished product 1a that extends along the MD direction and that is made stationary. More specifically, the stationary semi-finished product 1a may be cut at the product pitch P1 by alternately repeating a moving operation and a cutting operation; in the moving operation, the rotatable blade 31 moves by the product pitch P1 downstream in the MD direction with respect to the semi-finished product 1a, and in the cutting operation, the semi-finished product 1a is cut by moving the rotatable blade 31 in the CD direction.

In the foregoing embodiments, the cutting apparatus 10 having at least the downstream pressing member 55 is given as an example, but the invention is not limited thereto. For example, if a suction belt conveyor having a function that causes the semi-finished product 1a to be stuck on a transport surface that is the outer circumferential face of an endless belt is used as the intermittent transport mechanism 20, not only the upstream pressing member 51 but also the downstream pressing member 55 can be omitted. However, when such a suction belt conveyor is used, there is a possibility that tows which have dropped from the semi-finished product 1a clog a suction mechanism and cause breakdown of the conveyor. Accordingly, in order to avoid such breakdown, it is desirable that the ordinary belt conveyors 21 and 25 described in the first embodiment are used, and that the upstream pressing member 51 and the downstream pressing member 55 are provided corresponding to the belt conveyors 21 and 25.

What is claimed is:

1. A web-member cutting apparatus for cutting a web member along an intersecting direction,
the web member having a plurality of fibers including tows along a predetermined direction and being continuous in the predetermined direction, the intersecting direction intersecting the predetermined direction, the web-member cutting apparatus comprising:
a transport mechanism for transporting said web member to a cutting position,
a disc-like rotatable blade member that cuts the web member by relatively moving in the intersecting direction with respect to the web member while rotating about a rotation shaft without the rotatable blade member engaging an opposing member,
the rotation shaft extending along the predetermined direction,
the rotatable blade member including a cutting edge on an outer circumferential edge portion thereof,
a plurality of recess portions being formed on the cutting edge,
the plurality of recess portions being arranged along a circumferential direction of the rotatable blade member,
a mean value of lengths of the plurality of recess portions in the circumferential direction being smaller than a mean value of diameters of the tows contained in the web member.

2. A web-member cutting apparatus according to claim 1, wherein
the mean value of lengths of the plurality of recess portions in the circumferential direction is smaller than a minimum value of diameters of the tows contained in the web member.

3. A web-member cutting apparatus according to claim 1, wherein
a mean value of depths of the plurality of recess portions is smaller than the mean value of diameters of the tows contained in the web member.

4. A web-member cutting apparatus according to claim 3, wherein
the mean value of depths of the plurality of recess portions is smaller than a minimum value of diameters of the tows contained in the web member.

5. A web-member cutting apparatus according to claim 1, wherein
the rotatable blade member is made of cemented carbide,
the rotatable blade member has a perfect circular shape in which the rotation shaft is set at a center of the circle, and
an angle on the outer circumferential edge portion between both blade faces of the rotatable blade member is set to any value from 15° to 20° both inclusive.

6. A web-member cutting apparatus according to claim 1, wherein
the transport mechanism is an intermittent transport mechanism that intermittently transports the web member in a transport direction, the transport direction being the predetermined direction; and
the web-member cutting apparatus further comprises a downstream pressing member that regulates movement of the web member by pressing the web member against the intermittent transport mechanism at a position downstream from a target cut position in the transport direction throughout a period during which the rotatable blade member is cutting the web member whose transport is suspended.

7. A method for cutting a web member along an intersecting direction,
the web member having a plurality of fibers including tows along a predetermined direction and being continuous in the predetermined direction, the intersecting direction intersecting the predetermined direction, the method comprising:
rotating a disc-like rotatable blade member about a rotation shaft along the predetermined direction
the rotatable blade member including a cutting edge on an outer circumferential edge portion thereof,
a plurality of recess portions being formed on the cutting edge,
the plurality of recess portions being arranged along a circumferential direction of the rotatable blade member, a mean value of lengths of the plurality of recess portions in the circumferential direction being smaller than a mean value of diameters of the tows contained in the web member; and cutting the web member by rotating and relatively moving the rotatable blade member in an intersecting direction with respect to the web member without the rotatable blade member engaging an opposing member, the intersecting direction intersecting the predetermined direction.

* * * * *